US012672128B2

(12) United States Patent
Cavalcanti et al.

(10) Patent No.: US 12,672,128 B2
(45) Date of Patent: Jun. 30, 2026

(54) COMMUNICATION OF ASYNCHRONOUS ULTRA-LOW LATENCY TRANSMISSIONS WITHIN A SYNCHRONIZED TRANSMISSION OPPORTUNITY (S-TXOP)

(71) Applicant: Intel Corporation, Santa Clara, CA (US)

(72) Inventors: Dave A. Cavalcanti, Portland, OR (US); Juan Fang, Portland, OR (US); Minyoung Park, San Ramon, CA (US); Dibakar Das, Hillsboro, OR (US); Dmitry Akhmetov, Hillsboro, OR (US); Laurent Cariou, Milizac (FR)

(73) Assignee: Intel Corporation, Santa Clara, CA (US)

( * ) Notice: Subject to any disclaimer, the term of this patent is extended or adjusted under 35 U.S.C. 154(b) by 37 days.

(21) Appl. No.: 17/852,536

(22) Filed: Jun. 29, 2022

(65) Prior Publication Data

US 2022/0400503 A1 Dec. 15, 2022

(51) Int. Cl.
| | |
|---|---|
| *H04W 72/12* | (2023.01) |
| *H04W 72/1268* | (2023.01) |
| *H04W 72/543* | (2023.01) |
| *H04W 74/04* | (2009.01) |

(52) U.S. Cl.
CPC ..... *H04W 72/1268* (2013.01); *H04W 72/543* (2023.01); *H04W 74/04* (2013.01)

(58) Field of Classification Search
None
See application file for complete search history.

(56) References Cited

U.S. PATENT DOCUMENTS

| | | | |
|---|---|---|---|
| 2016/0105836 A1* | 4/2016 | Seok | H04W 72/23 370/331 |
| 2019/0281484 A1* | 9/2019 | Jiang | H04L 1/0026 |
| 2020/0267636 A1 | 8/2020 | Cavalcanti et al. | |
| 2021/0274516 A1* | 9/2021 | Zuo | H04L 5/0044 |
| 2021/0410149 A1* | 12/2021 | Xia | H04W 72/30 |
| 2024/0244599 A1* | 7/2024 | Kim | H04W 72/12 |
| 2025/0031255 A1* | 1/2025 | Hou | H04W 76/11 |

FOREIGN PATENT DOCUMENTS

| | | | | |
|---|---|---|---|---|
| WO | WO-2018203923 A1 * | 11/2018 | | H04W 48/12 |
| WO | WO-2019125396 A1 | 6/2019 | | |
| WO | WO-2019236052 A1 | 12/2019 | | |

* cited by examiner

*Primary Examiner* — Steve R Young
(74) *Attorney, Agent, or Firm* — Schwegman Lundberg & Woessner, P.A.

(57) ABSTRACT

An access point station (AP) communicates with a plurality of non-AP stations (STAs) within a synchronized transmission opportunity (S-TXOP). The S-TXOP may comprise an S-TXOP trigger followed by a plurality of S-TXOP slots. The S-TXOP slots may be configured for communication of synchronous data. For communication of small time-critical (TC) packets within the S-TXOP with one or more of the STAs, the AP may configure the S-TXOP for asynchronous ultra-low latency (ULL) transmissions by providing a low-latency channel access opportunity within the S-TXOP.

18 Claims, 17 Drawing Sheets

COMMUNICATION OF ASYNCHRONOUS ULTRA-LOW LATENCY TRANSMISSIONS WITHIN A SYNCHRONIZED TRANSMISSION OPPORTUNITY (S-TXOP)

RELATED APPLICATION

This application is related to U.S. patent application Ser. No. 17/824,520, filed May 25, 2022, entitled "ACCESS POINT CONFIGURED FOR SIGNALING CONFIGURA-TION AND RESOURCE ALLOCATION INSIDE A SYN-CHRONIZED TRANSMISSION OPPORTUNITY (S-TXOP)".

TECHNICAL FIELD

Embodiments pertain to wireless communications. Some embodiments relate to wireless networks including wireless local area networks (WLANS) including those operating in accordance with the IEEE 802.11 standards. Some embodi-ments relate to wireless time-sensitive networks (TSN) and wireless time-sensitive networking (WTSN).

BACKGROUND

Emerging time-sensitive (TS) applications represent new markets for Wi-Fi. Industrial automation, robotics, AR/VR and HMIs (Human-Machine Interface) are example appli-cations. Many time-sensitive applications require ultra-low latency (ULL) with minimal queuing and medium access delay within a wireless system. For instance, Programable Logic Controller (PLCs) may execute control loops requir-ing isochronous (cyclic) transmission of small time-critical (TC) packets (typically a few bytes) with cycles of 10's of microseconds. Furthermore, applications that need ULL typically also require very high reliability. The ULL require-ment for TC packets practically imposes very high reliability requirements as multiple retransmissions (following the typical Wi-Fi protocols) are not feasible.

Although IEEE 802.11ax has introduced triggered-based OFDMA operation, the overhead involved in the basic trigger-based data exchange within a TXOP is high, espe-cially for small packet sizes. Many time-sensitive applica-tions involve isochronous (cyclic) transmission of small packets (typically a few bytes) within very short cycles with high reliability. Thus what is needed are communication techniques suitable for time-sensitive applications that require lower overhead and are compatible with legacy network communications (i.e., IEEE 802.11ax and previous versions of the 802.11 standard). Thus what is also needed are ways of providing transmission opportunities for small time-critical (TC) packets with high efficiency.

DETAILED DESCRIPTION

Figure 1A:
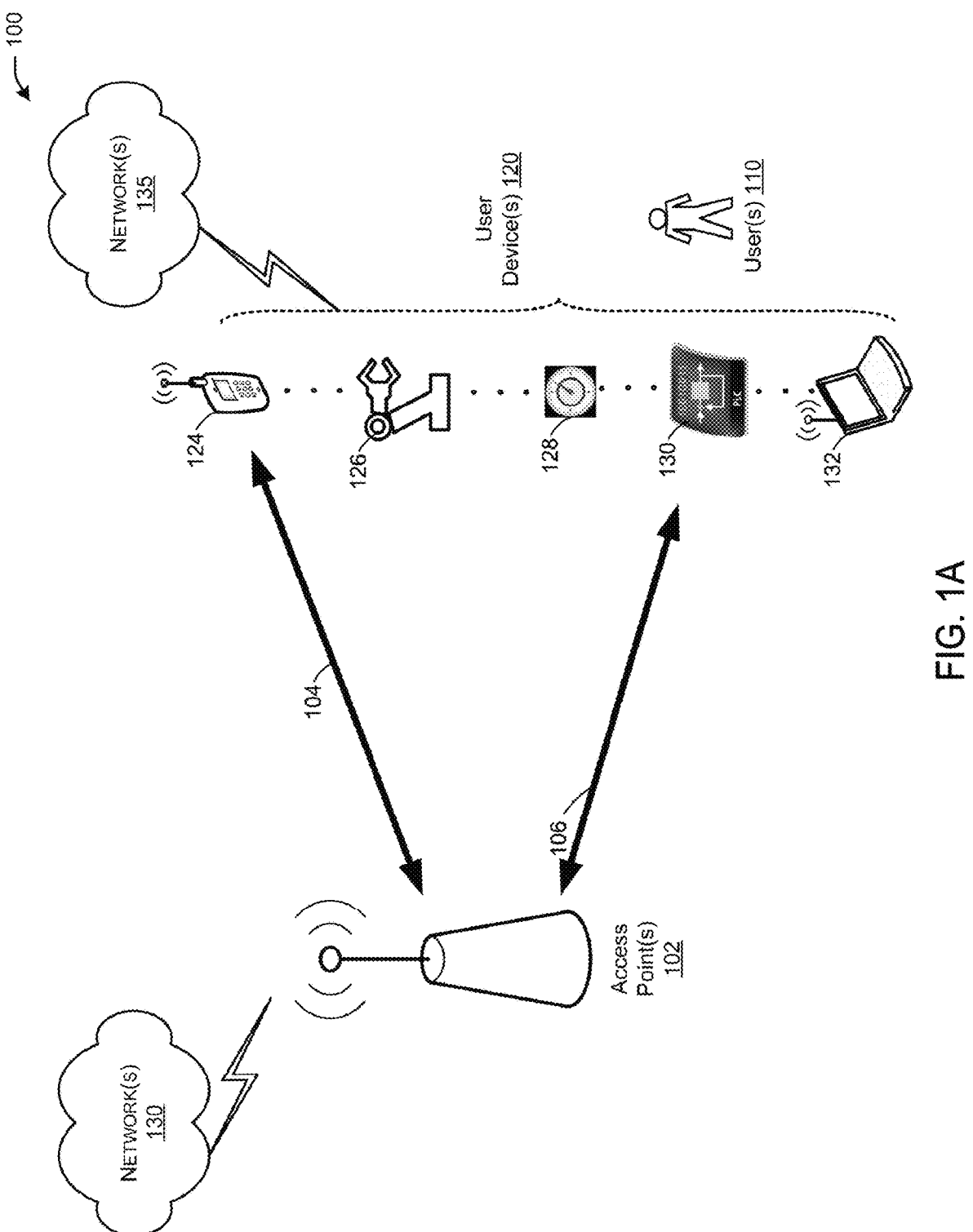
FIG. 1A illustrates an example network, in accordance with some embodiments.

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodi-ments set forth in the claims encompass all available equiva-lents of those claims.

Embodiments disclosed herein may utilize an synchro-nized transmission opportunity (S-TXOP) that allows very low overhead data transmission in WLANs, including TSNs, targeting isochronous traffic with strict latency bounds. The S-TXOP allows PPDU lengths to be reduced by eliminating some legacy parts in a preamble and by compressing sig-naling for allocating resources. For example, in the UL (e.g., information in Basic TF) or DL direction (e.g., information in EHT-SIG-B), an index to a known allocation may be provided within the PPDU rather than providing the com-plete resource allocation.

Some embodiments are directed to asynchronous ultra-low latency (ULL) transmissions within synchronized trans-mission opportunities (S-TXOPs). In some embodiments, an access point station (AP) may configure an S-TXOP for asynchronous ULL transmissions by providing a low-la-tency channel access opportunity within the S-TXOP. These embodiments are discussed in more detail below.

Some embodiments are directed to an access point station (AP) configured for communicating with a plurality of non-AP stations (STAs) within a synchronized transmission opportunity (S-TXOP). The S-TXOP may comprise an S-TXOP trigger followed by a plurality of S-TXOP slots. In these embodiments, the S-TXOP slots may be configured for communication of synchronous data. In these embodiments, for communication of small time-critical (TC) packets within the S-TXOP with one or more of the STAs, the AP may configure the S-TXOP for asynchronous ultra-low latency (ULL) transmissions by providing a low-latency channel access opportunity within the S-TXOP. These embodiments, as well as others, are described in more detail below.

Reliable and deterministic communications between devices may be required in some circumstances. One example may be time sensitive networking (TSN). TSN applications may require very low and bounded transmission latency and high availability and may include a mix of traffic patterns and requirements from synchronous data flows (e.g., from sensors to a controller in a closed loop control system), to asynchronous events (e.g., a sensor detecting an anomaly in a monitored process and sending a report right away), to video streaming for remote asset monitoring and background IT/office traffic. Many TSN applications also may require communication between devices with ultra-low latency (e.g., on the order of tens of microseconds).

Autonomous systems, smart factories, professional audio/video, and mobile virtual reality are examples of time sensitive applications that may require low and deterministic latency with high reliability. Deterministic latency/reliability may be difficult to achieve with existing Wi-Fi standards (e.g., the IEEE 802.11 family of standards), which may focus on improving peak user throughput (e.g., the IEEE 802.11ac standard) and efficiency (e.g., the IEEE 802.11ax standard). Extending the application of Wi-Fi beyond consumer-grade applications to provide wireless TSN (WTSN) performance presents an opportunity to apply Wi-Fi to Internet of things (IOT), and new consumer markets (e.g., wireless virtual reality). The non-deterministic nature of the IEEE 802.11 medium access control (MAC) layer in an unlicensed spectrum may impose challenges to expanding the application of Wi-Fi in this manner, especially when trying to guarantee reliability in comparison to Ethernet TSN applications.

It may be desirable to enable time-synchronized and scheduled MAC layer communications to facilitate time sensitive transmissions over Wi-Fi. The MAC may benefit from a more flexible control/management mechanism to adapt scheduling and/or transmission parameters (e.g., adapt a modulation and coding scheme and increase power) to control latency and to increase reliability. For example, changes in a wireless channel, such as interference or fading, may trigger retransmissions, which may impact the latency for time sensitive data due to increased channel throughput. An access point (AP) may update station (STA) transmission parameters to increase reliability (e.g., increase transmission power), which may require a transmission schedule update. An AP may also reduce a number of STAs that share a given service period to provide more capacity for retransmissions within a maximum required latency. Another example may include high-priority data (e.g., random alarms/events in an industrial control system), which may need to be reported with minimal latency, but cannot be scheduled a priori. Although regular beacons may be used to communicate scheduling and other control/management updates, it may be desirable to have a more deterministic and flexible control mechanism in future Wi-Fi networks that may enable faster management/scheduling of a wireless channel to facilitate time sensitive applications with high reliability and efficiency.

It may also be desirable to ensure that devices in a network or extended service set (ESS) receive schedule updates and maintain a synchronized schedule. Once a time sensitive transmission schedule is updated, all devices may need to receive the updated schedule before the schedule may become applicable, otherwise the updated schedule may not be reliable (e.g., not all devices may properly follow the schedule). To meet the requirements of time sensitive traffic, it may be desirable to ensure that all relevant devices comply with schedule updates regardless of active and sleep states of the devices.

To enable synchronization and scheduling, control/management frames may be used. Control/management frames may share a channel with data frames. It may be desirable, however, to have a dedicated channel for control/management frames that may be separate from a data channel. In addition, it may be desirable to have mechanisms to enable dynamic control/management actions using controlled latency and high reliability. Something other than beacon transmissions by themselves may be beneficial to enable dynamic and fast updates to operations required to maintain a quality of service for time sensitive applications.

To support such WTSN operations, it may be beneficial to redesign the MAC layer and physical layer (PHY) to improve efficiency and performance without needing to consider legacy behaviors or support backward compatibility while being able to coexist with legacy devices. A greenfield mode may refer to a device that assumes that there are no legacy (e.g., operating under previous protocol rules) stations (STAs) using the same channel. Thus, a device operating with a greenfield mode may operate under an assumption that all other STAs follow the same (e.g., newest) protocols, and that no legacy STAs are competing for the same channel access. In some embodiments, an STA operating with a greenfield mode may at least assume that any legacy STAs that may exist may be managed to operate in a separate channel and/or time. However, operations with multiple access points (APs) may experience interference, latency, and/or other performance issues. For example, APs may not all be aware of what other APs and STAs may be doing. Therefore, it may be desirable to define a greenfield Wi-Fi operation in a 6-7 GHz band or another frequency band, and thereby enable a time synchronized scheduled access mode for multiple APs in the 6-7 GHz band or other existing frequency bands (e.g., 2.4 GHz, 5 GHz) of future Wi-Fi generations.

The design of a greenfield air interface may be governed by significant reliability and latency constraints imposed by WTSN operations. It may therefore be desirable to efficiently design MAC and PHY communications to support WTSN applications. Legacy MAC/PHY operations may be asynchronous and may apply contention-based channel access and may require significant overhead for backward compatibility that may be important for devices to coexist in unlicensed frequency bands. Such legacy MAC/PHY operations may be too inefficient to support time sensitive applications, especially as such traffic increases, but they may still be used for non-time sensitive data or control traffic (e.g. in a legacy control channel).

While contention-free channel access mechanisms exist (e.g., point coordination function, hybrid coordination function controlled channel access), such mechanisms may lack the predictability required to support WTSN operations, as the mechanisms may be stacked on a distributed coordination function and may use polling operations with significant overhead and other inefficient steps.

Device synchronization may use transmissions with significant overhead. For example, PHY headers may be included in some or all transmissions between devices. For example, data frames and acknowledgement (ACK) frames may use legacy preambles that make the frames longer, reducing the number of transmissions that may be accomplished during a transmission opportunity (TXOP). Synchronization that occurs up front (e.g., at the start of a TXOP) may allow for reduced overhead in subsequent transmissions, and therefore may reduce the resources required for some transmissions and may allow for more throughput and lower latency in a channel.

Example embodiments of the present disclosure relate to systems, methods, and devices for enhanced time sensitive networking for wireless communications. In some embodiments, time sensitive control and data channel operations may be enabled for IEEE 802.11 standards, including for future generations of IEEE 802.11 standards (e.g., beyond IEEE 802.11ax, including 6-7 GHz communication bands, and/or in deployments in which it may be feasible to enable channel/band steering of an STA with time sensitive requirements, such as in managed private networks.

In some embodiments, control information may be updated (e.g., using scheduling) without interfering with time sensitive data, ensuring latency and reliability guarantees. For example, a time sensitive data transmission may be needed, and control information such as transmission schedules may also need to be updated to facilitate subsequent transmission. The control information updates may be sent and implemented without interfering with the time sensitive data transmissions.

In some embodiments, a time sensitive control channel (TSCCH) may be defined by combining two approaches: a periodic approach and an on-demand approach. The period approach may include predefined control slots. In the on-demand approach, an AP may define control slots as needed. A TSCCH access mechanism may use contention-based or time synchronized scheduled access procedures. Also, a wake-up signal may be used to allow delivery of time sensitive control/management information to STAs across a network, reducing latency and allowing power save modes for the STAs.

In some embodiments, a TSCCH may be in a different physical/logical channel from a data transmission. For example, a data transmission may use a data channel (e.g., in a 6-7 GHz band) while TSCCH may use separate control channel in another band (e.g., 2.4 GHz or 5 GHz).

In some embodiments, use of a TSCCH operation and access mechanism may allow improved flexibility and more deterministic opportunities for an AP to provide timely updates (e.g., schedules and control parameters) needed to manage latency and reliability, which may be beneficial in supporting time sensitive applications.

In some embodiments, a greenfield operation deployed in existing or new frequency bands (e.g., 6-7 GHz) and other managed networks may facilitate improved management of Wi-Fi networks operating in scheduled modes with time sensitive operations.

In some embodiments, it may be assumed that a Wi-Fi network may be managed and that there are no unmanaged nearby Wi-Fi STAs or networks. This assumption may be reasonable for time sensitive applications.

In some embodiments, it may be assumed that APs and STAs may synchronize their clocks to a master reference time. For example, STAs may synchronize to beacons and/or may use time synchronization protocols (e.g., as defined by the IEEE 802.1AS standard or other synchronization capabilities defined in the 802.11 standard).

In one or embodiments, it may be assumed that an AP may define a time-synchronized scheduled mode. In some embodiments, a greenfield mode may apply to a 6-7 GHz frequency band, and the greenfield mode may apply to other bands (e.g., 2.4 GHz, 5 GHz) where support for legacy devices may not be required (e.g., in some private networks). A greenfield mode may be applied according to the following principles.

In some embodiments, a fully synchronized and scheduled operation may be defined for a self-contained/synchronized transmission opportunity (S-TXOP) that may include a series of both uplink and downlink transmissions. During an S-TXOP, an AP may maintain control of a medium and may schedule access across predefined deterministic time boundaries. The use of an S-TXOP may maximize an amount of TSN traffic served while providing latency and reliability guarantees that support time sensitive operations with high efficiency.

In some embodiments, communication overheads related to synchronization, channel measurement and feedback, scheduling, and resource allocation may be intelligently packed at the beginning of an S-TXOP and may allow subsequent data transmissions to be extremely lightweight with minimal overhead. For example, up-front synchronization may allow for devices to be configured so that the devices do not need as much information as is currently provided in legacy headers. Instead, headers may be shorter because an S-TXOP has been coordinated among devices. The reduced overhead may allow for more TSN traffic to be served while providing sufficient latency and reliability of transmissions.

In some embodiments, there may be flexibility to define deterministic communication boundaries within an S-TXOP to accommodate applications requiring latency bounds in a sub-millisecond range, or other tight time ranges, for example.

In some embodiments, a multi-band framework may be leveraged to allow backward compatibility and coexistence with legacy Wi-Fi applications. A new greenfield mode as defined herein may be used for data communications, and minimal control may be required to sustain target latency, reliability, and throughput performance. Legacy modes and bands may be used to perform basic/long-term control and management tasks (e.g., non-time sensitive tasks) as well as time sensitive tasks.

In some embodiments, to reduce overhead for coexistence, a first transmission in an S-TXOP may include a legacy preamble to enable coexistence with legacy devices.

In some embodiments, enhanced time sensitive networking may improve performance over some existing wireless communications. For example, efficiency and latency may be improved, and the enhanced time sensitive networking may support a larger number of STAs for a given wireless resource while meeting latency bounds for TSN applications. (e.g., augmented virtual reality, industrial control, and autonomous systems). Enhanced time sensitive networking may allow coexistence with legacy Wi-Fi operations by leveraging multi-band devices. Coexistence across networks operating in a greenfield mode as defined herein may be allowed by having better management and coordination across basic service sets (BSSs), which may be facilitated by higher layer management/coordination protocols.

In some embodiments, a number of assumptions may be used for the greenfield mode of enhanced time sensitive networking. In some embodiments, WTSN STAs may be multi-band devices in which the MAC/PHY may operate in a different band (e.g., 6-7 GHz) than the band of a legacy STA, which may operate in 2.4 GHz or 5 GHz bands.

In some embodiments, a fully managed Wi-Fi deployment scenario in which other radio technology (e.g., legacy Wi-Fi or cellular) may not be expected to operate in a same band where a WTSN STA may be operating. In some embodiments, the enhanced time sensitive networking may be used in an indoor operating environment with relatively low mobility.

In some embodiments, a packet belonging to a TSN-grade application when queued at a WTSN STA may be dropped at a transmitter side if the packet does not get into air within a certain latency bound time.

The above descriptions are for purposes of illustration and are not meant to be limiting. Numerous other examples, configurations, processes, etc., may exist, some of which are described in detail below. Example embodiments will now be described with reference to the accompanying figures.

FIG. 1A is a diagram illustrating an example network environment, in accordance with some embodiments. Wireless network 100 may include one or more user devices 120 and one or more access point(s) (APs) 102, which may communicate in accordance with and compliant with various communication standards and protocols, such as, Wi-Fi, TSN, Wireless USB, P2P, Bluetooth, NFC, or any other communication standard. The user device(s) 120 may be mobile devices that are non-stationary (e.g., not having fixed locations) or may be stationary devices.

Figure 6:
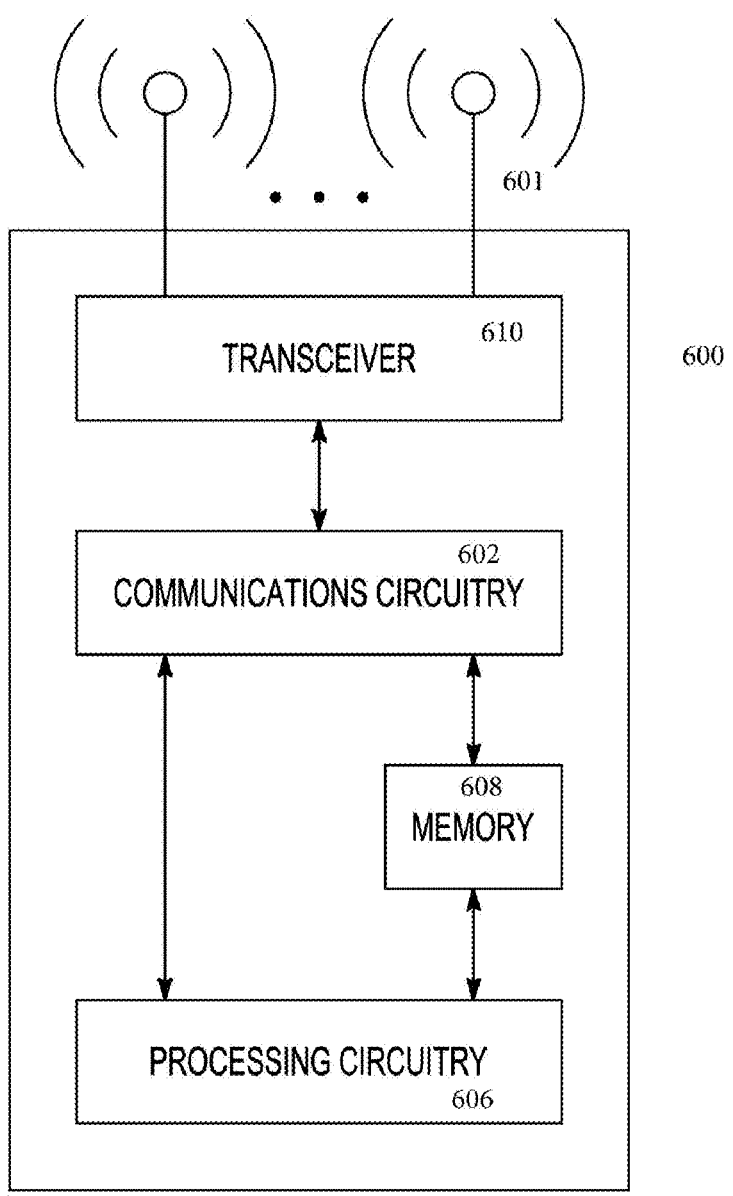
FIG. 6 illustrates a wireless communication device, in accordance with some embodiments.

In some embodiments, the user devices 120 and AP 102 may include one or more computer systems similar to that of the functional diagram of FIG. 6. One or more illustrative user device(s) 120 and/or AP 102 may be operable by one or more user(s) 108. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP 102 may operate as a personal basic service set (PBSS) control point/access point (PCP/AP). The user device(s) 120 (e.g., 124, 126, or 128) and/or AP 102 may include any suitable processor-driven device including, but not limited to, a mobile device or a non-mobile, e.g., a static, device. For example, user device(s) 120 and/or AP 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an Ultrabook™ computer, a notebook computer, a tablet computer, a server computer, a handheld computer, a handheld device, an internet of things (IoT) device, a sensor device, a robotic device, an actuator, a robotic arm, an industrial robotic device, a programmable logic controller (PLC), a safety controller and monitoring device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

Any of the user device(s) 120 (e.g., user devices 124, 126, 128, 130, and 132), and AP 102 may be configured to communicate with each other via one or more communications networks 135 and/or 140 wirelessly or wired. The user device(s) 120 may also communicate peer-to-peer or directly with each other with or without the AP 102. Any of the communications networks 135 and/or 140 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 135 and/or 140 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 135 and/or 140 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128, 130, and 132) and AP 102 may include one or more communications antennas. The one or more communications antennas may be any suitable type of antennas corresponding to the communications protocols used by the user device(s) 120 (e.g., user devices 124, 126, 128, 130, and 132), and AP 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP 102.

Any of the user device(s) 120 (e.g., user devices 124, 126, 128, 130, and 132), and AP 102 may be configured to perform directional transmission and/or directional reception in conjunction with wirelessly communicating in a wireless network. Any of the user device(s) 120 (e.g., user devices 124, 126, 128, 130, and 132), and AP 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128, 130, and 132), and AP 102 may be configured to perform any given directional transmission towards one or more defined transmit sectors. Any of the user device(s) 120 (e.g., user devices 124, 126, 128, 130, and 132), and AP 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP 102 may be configured to use all or a subset of its one or more communications antennas to perform MIMO beamforming.

Any of the user devices 120 (e.g., user devices 124, 126, 128, 130, and 132), and AP 102 may include any suitable radio and/or transceiver for transmitting and/or receiving radio frequency (RF) signals in the bandwidth and/or channels corresponding to the communications protocols utilized by any of the user device(s) 120 and AP 102 to communicate with each other. The radio components may include hardware and/or software to modulate and/or demodulate communications signals according to pre-established transmission protocols. The radio components may further have hardware and/or software instructions to communicate via one or more communication standards and protocols, such as, Wi-Fi, TSN, Wireless USB, Wi-Fi P2P, Bluetooth, NFC, or any other communication standard. In certain example embodiments, the radio component, in cooperation with the communications antennas, may be configured to communicate via 2.4 GHz channels (e.g. 802.11b, 802.11g, 802.11n, 802.11ax), 5 GHz channels (e.g. 802.11n, 802.11ac, 802.11ax), or 60 GHZ channels (e.g. 802.11ad). In some embodiments, non-Wi-Fi protocols may be used for communications between devices, such as Bluetooth, dedicated short-range communication (DSRC), Ultra-High Frequency (UHF) (e.g. IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

When an AP (e.g., AP 102) establishes communication with one or more user devices 120 (e.g., user devices 124, 126, 128, 130 and/or 132), the AP 102 may communicate in a downlink direction and the user devices 120 may communicate with the AP 102 in an uplink direction by sending frames in either direction. The user devices 120 may also communicate peer-to-peer or directly with each other with or without the AP 102. The data frames may be preceded by one or more preambles that may be part of one or more headers. These preambles may be used to allow a device (e.g., AP 102 and/or user devices 120) to detect a new incoming data frame from another device. A preamble may be a signal used in network communications to synchronize transmission timing between two or more devices (e.g., between the APs and user devices).

In some embodiments, and with reference to FIG. 1A, an AP 102 may communicate with user devices 120. The user devices 120 may include one or more wireless devices (e.g., user devices 124, 132) and one or more wireless TSN devices (e.g., user devices 126 128, 130). The user devices may access a channel in accordance with medium access control (MAC) protocol rules or any other access rules (e.g., Wi-Fi, Bluetooth, NFC, etc.). It should be noted that reserving a dedicated TSN channel and controlling access to it may also be applicable to cellular systems/3GPP networks, such as LTE, 5G, or any other wireless networks. The wireless TSN devices may also access a channel according to the same or modified protocol rules. However, the AP 102 may dedicate certain channels or sub-channels for TSN applications that may be needed by the one or more wireless TSN devices (e.g., user devices 126, 128, and 130), and may allocate other channels or sub-channels for the non-TSN devices (e.g., user devices 124 and 132).

In some embodiments, AP 102 may also define one or more access rules associated with the dedicated channels. A channel may be dedicated for TSN transmissions, TSN applications, and TSN devices. For example, user device 126 may access a dedicated TSN channel for TSN transmissions. TSN transmissions may include transmissions that have very low transmission latency and high availability requirements. Further, the TSN transmissions may include synchronous TSN data flows between sensors, actuators, controllers, robots, in a closed loop control system. The TSN transmissions require reliable and deterministic communications. A channel may be accessed by the user device 126 for a number of TSN message flows and is not limited to only one TSN message flow. The TSN message flows may depend on the type of application messages that are being transmitted between the AP 102 and the user device 126.

In some embodiments, while frequency planning and channel management may be used to allow AP 102 to collaborate with neighboring APs (not shown) to operate in different channels, the efficiency and feasibility of reserving multiple non-overlapping data channels for time sensitive applications may be improved. It may be desirable to limit the amount of resources reserved for time sensitive data through efficient channel reuse. If multiple devices (e.g., user devices 124, 126, 128, 130, 132) share a dedicated channel for time sensitive data transmissions, interference among multiple transmissions may be reduced with enhanced coordination between the devices and one or more APs (e.g., AP 102). For example, overlap and interference of control transmissions (e.g., a beacon), downlink data transmissions, and uplink data transmissions may be reduced with enhanced coordination. Such enhanced coordination for multiple APs may enable more efficient channel usage while also meeting latency and reliability requirements of time sensitive applications. For example, if control transmissions are not received and interpreted properly, time sensitive operations may not be scheduled properly, and/or may interfere with other transmissions, possibly causing operational errors.

In some embodiments, AP 102 may include WTSN controller functionality (e.g., a wireless TSN controller capability), which may facilitate enhanced coordination among multiple devices (e.g., user devices 124, 126, 128, 130, 132). AP 102 may be responsible for configuring and scheduling time sensitive control and data operations across the devices. A wireless TSN (WTSN) management protocol may be used to facilitate enhanced coordination between the devices, which may be referred to as WTSN management clients in such context. AP 102 may enable device admission control (e.g., control over admitting devices to a WTSN), joint scheduling, network measurements, and other operations.

In some embodiments, AP 102's use of WTSN controller functionality may facilitate AP synchronization and alignment for control and data transmissions to ensure latency with high reliability for time sensitive applications on a shared time sensitive data channel, while enabling coexistence with non-time sensitive traffic in the same network.

In some embodiments, AP 102 and its WTSN coordination may be adopted in future Wi-Fi standards for new bands (e.g., 6-7 GHz), in which additional requirements of time synchronization and scheduled operations may be used. Such application of the WTSN controller functionality may be used in managed Wi-Fi deployments (e.g., enterprise, industrial, managed home networks, etc.) in which time sensitive traffic may be steered to a dedicated channel in existing bands as well as new bands.

In some embodiments, it may be assumed that a Wi-Fi network may be managed, and that there are no unmanaged Wi-Fi STAs/networks nearby.

In some embodiments, it may be assumed that APs and STAs may synchronize their clocks to a master reference times (e.g., STAs may synchronize to beacons and/or may use time synchronization protocols as defined in the IEEE 802.1AS standard).

In some embodiments, it may be assumed that APs and STAs may operate according to a time synchronized scheduled mode that may also apply to new frequency bands (e.g., 6-7 GHz), for which new access protocols and requirements also may be proposed.

In some embodiments, a WTSN domain may be defined as a set of APs (e.g., AP 102) and STAs (e.g., user devices 124, 126, 128, 130, and 132) that may share dedicated wireless resources, and therefore may need to operate in close coordination, at a level of control and time sensitive data scheduling, to ensure latency and reliability guarantees. Different APs in the same network may form different WTSN domains.

In some embodiments, the WTSN management protocol may be executed over a wired (e.g., Ethernet) TSN infrastructure that may provide TSN grade time synchronization accuracy and latency guarantees. The WTSN management protocol may also be executed using wireless links (e.g., a wireless backhaul, which may include Wi-Fi or WiGig links through one or multiple hops). An Ethernet TSN interface may be replaced by a wireless interface (e.g., and 802.11 MAC and/or physical layer PHY). An operation of a second wireless interface may also be managed by AP 102 to avoid interference with an interface used for communication with time sensitive user STAs (e.g., user devices 126, 128, and 130).

In some embodiments, AP 102 may perform admission control and scheduling tasks. To complete an association procedure for an STA with time sensitive data streams (e.g., user device 130), the STA may request admission from AP 102. AP 102 may define which APs may be in a WTSN domain and may determine the admission of new time sensitive data streams based on, for example, available resources and user requirements. AP 102 may create and/or update a transmission schedule that may include time sensitive operations and/or non-time sensitive operations, and the schedule may be provided to admitted user devices. AP 102 may be responsible for executing the schedule according to time sensitive protocols defined, for example, at 802.11 MAC/PHY layers.

In some embodiments, AP 102 may perform transmission schedule updates. AP 102 may update a transmission schedule for time sensitive data and may send transmission schedule updates to STAs and/or other APs during network operation. A transmission schedule update may be triggered by changes in wireless channel conditions at different APs and/or STAs within a common WTSN domain. The condition changes may include increased interference, new user traffic requests, and other network and/or operational changes that may affect a WTSN domain.

In some embodiments, AP 102 may collect measurement data from other devices in a WTSN domain. The measurement data may be collected from time sensitive and/or non-time sensitive devices. AP 102 may maintain detailed network statistics, for example, related to latency, packet error rates, retransmissions, channel access delay, etc. The network statistics may be collected via measurement reports sent from STAs. AP 102 may use network statistics to proactively manage wireless channel usage to allow for a target latency requirement to be satisfied. For example, measurements may be used to determine potential channel congestion and to trigger a change from a joint transmission schedule mode to a mode in which APs may allocate a same slot to multiple non-interfering STAs that may be leveraging spatial reuse capabilities.

It is understood that the above descriptions are for purposes of illustration and are not meant to be limiting.

Figure 1B:
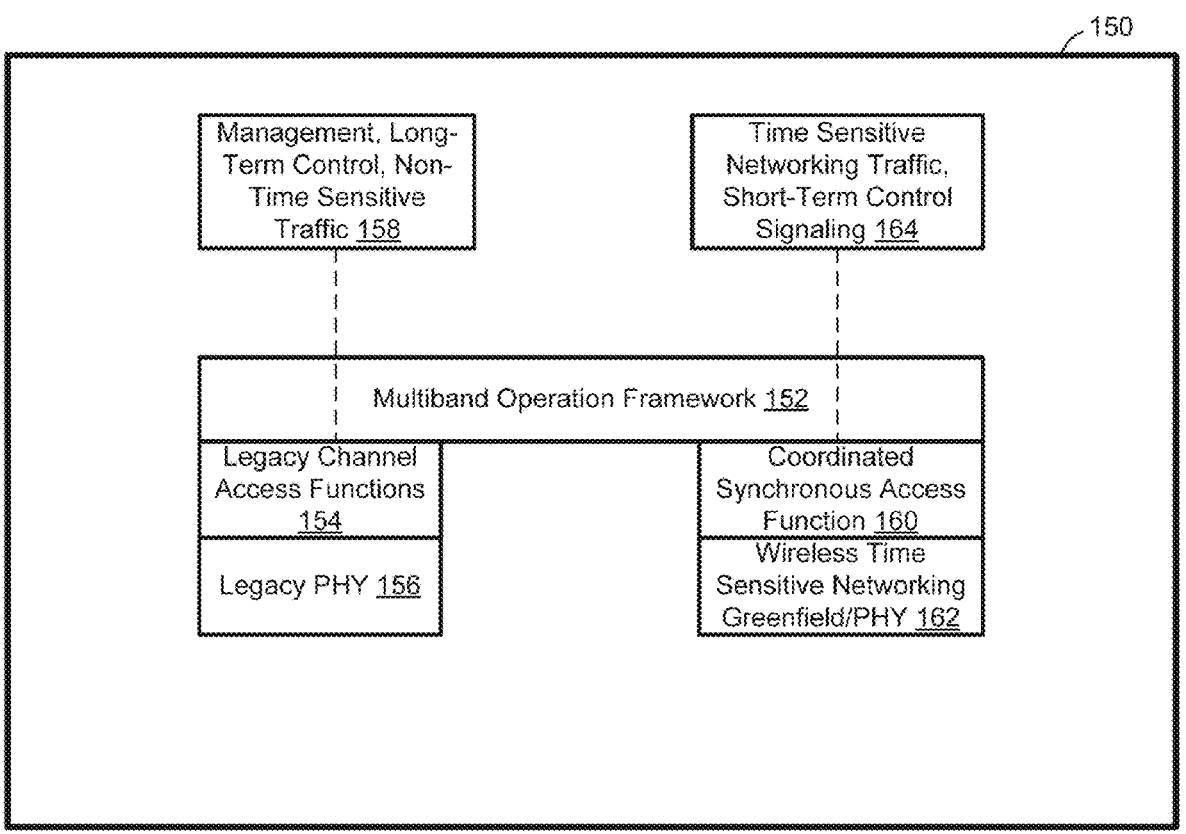
FIG. 1B illustrates an enhanced wireless time sensitive networking (WTSN) medium access control/physical layer (MAC/PHY) configuration for a WTSN device, in accor-dance with some embodiments.

FIG. 1B illustrates an enhanced WTSN MAC/PHY configuration for a WTSN device 150, in accordance with some embodiments.

In some embodiments, the WTSN device 150 may include a multiband operation framework 152, legacy channel access functions 154, legacy PHY 156, management, long-term control, and non-time sensitive traffic 158, coordinated synchronous access function (CSAF) 160, WTSN greenfield/PHY 162, and TSN traffic, short-term control signaling 164.

In some embodiments, the multiband operation framework 152 may allow WTSN device 150 to perform multiband operations. For example, some operations may be performed in one frequency band, while other operations may be performed in another frequency band. One frequency band may include a control channel, and another frequency band may include separate data channels.

In some embodiments, to provide for both WTSN and non-TSN operations, the WTSN device 150 may include a link for management, long-term control, and non-time sensitive traffic 158, and a link for TSN traffic and short-term control signaling 164. To support the management, long-term control, and non-time sensitive traffic 158, WTSN device 150 may include legacy channel access functions 154. Legacy channel access functions 154 may include a distributed coordination function (DCF), hybrid coordination function controlled channel access (HCF), and other channel access functions. The management, long-term control, and non-time sensitive traffic 158 may also be supported by a legacy PHY 156 (e.g., on a 2.4 GHz or 5 GHz frequency). Long-term control may include beacon transmissions, network association, security procedures, and other control traffic. Short-term control may include radio synchronization (e.g., time-frequency synchronization), scheduling, channel feedback, and other control traffic.

In some embodiments, to support the TSN traffic, short-term control signaling 164, WTSN device 150 include the CSAF 160 and the WTSN greenfield/PHY 162. The CSAF 160 may use a central coordinator at WTSN device 150 (e.g., AP 102 of FIG. 1A) to maintain a MAC/PHY level synchronization between the WTSN device 150 and non-AP STAs during an S-TXOP. The WTSN device 150 may control access to wireless media in a scheduled fashion in time, frequency, and spatial dimensions. With an infrastructure for a basic service set (BSS) for WTSN, during an S-TXOP, all WTSN STAs may need to adhere to the MAC/PHY synchronization at all times.

In some embodiments, when WTSN STAs (e.g., user device 126, user device 128, user device 130 of FIG. 1A) are not standalone devices, WTSN-capable devices may associate with a network using a legacy link (e.g., legacy channel access functions 154, legacy PHY 156, and management, long-term control, non-time sensitive traffic 158 of FIG. 1B). During association, a WTSN STA may indicate its capability and interest to join a WTSN operation mode. Through the legacy link, a multiband AP (e.g., AP 102 of FIG. 1A) may instruct the WTSN-capable STA to configure the WTSN STA's MAC/PHY on designated band. The WTSN MAC in the WTSN STA may achieve MAC/PHY synchronization and successfully read initial control and synchronization information in a synchronization and configuration frame (SCF) received from the AP in a WTSN band. Through the legacy link, the AP and STA may complete the association process by exchanging management frames. This process may be referred to as associating or establishing a channel/connection with a device.

In some embodiments, some long-term parameters and control signals related to a WTSN MAC/PHY operation may be conveyed from a WTSN AP to WTSN non-AP STAs through the legacy link.

In some embodiments, the legacy link may also be used for admission control and/or inter-BSS coordination, and the multiband operation framework 152 may be used to direct TSN traffic (e.g., TSN traffic, short-term control signaling 164) to the WTSN MAC/PHY (e.g., WTSN Greenfield/PHY 162). The WTSN MAC/PHY may provide functionality to support ultra-low and near-deterministic packet latency (e.g., one millisecond or less) with virtually no jitter in a controlled environment. Latency may be measured from a time when a logical link control (LLC) MAC service data unit (MDSU) enters a MAC sublayer at a transmitter to a time when the MDSU is successfully delivered from the MAC sublayer to an LLC sublayer on a receiver.

In some embodiments, WTSN operations may be facilitated by a synchronous and coordinated MAC/PHY operation during an S-TXOP between a WTSN AP and one or more non-AP WTSN STAs in a BSS infrastructure.

It is understood that the above descriptions are for purposes of illustration and are not meant to be limiting.

Figure 2:
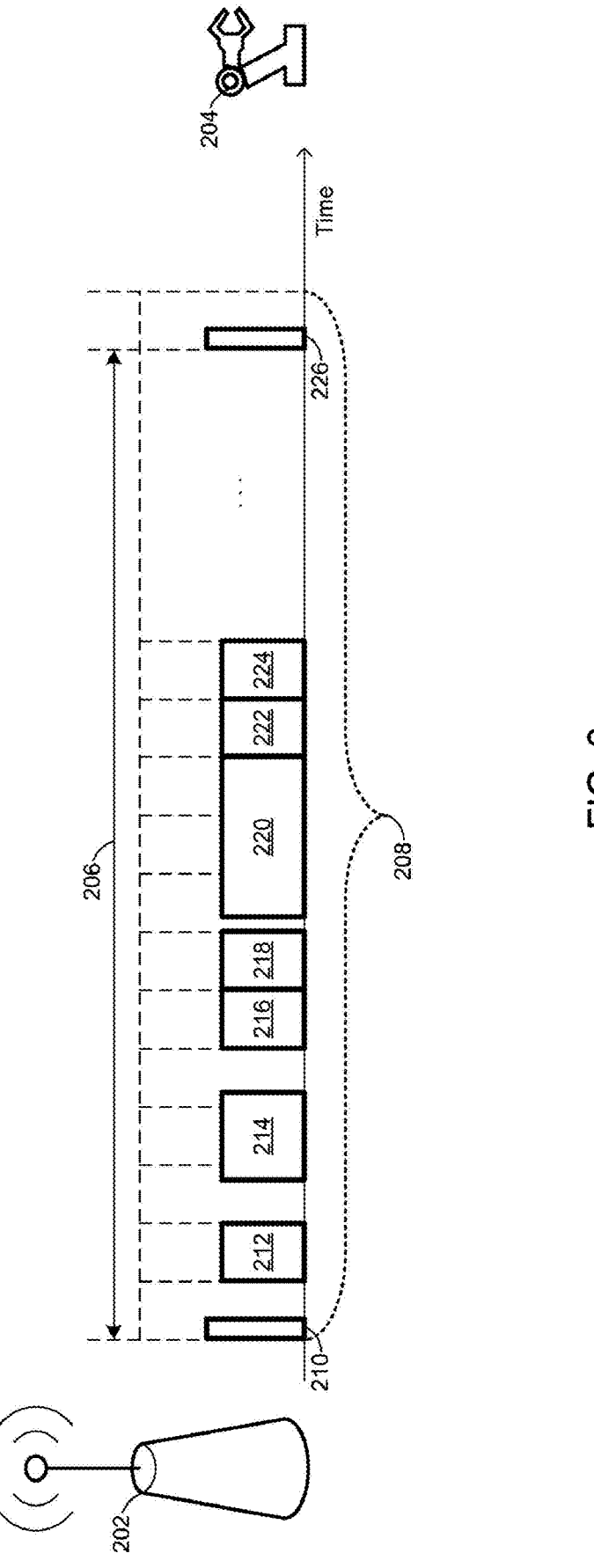
FIG. 2 illustrates a timing diagram of an enhanced WTSN time synchronization, in accordance with some embodi-ments.

FIG. 2 illustrates an timing diagram 200 of an enhanced WTSN time synchronization, in accordance with some embodiments. Referring to FIG. 2, there is shown uplink and downlink data frame flows between AP 202 and a TSN device 204. For example, TSN device 204 may receive downlink data frames from AP 202 and may send uplink data frames to AP 202. In one embodiment, the WTSN time synchronization may be utilized for persistent scheduling for synchronous transmission from TSN device 204 to AP 202.

In some embodiments, during a beacon period 206 (e.g., 100× cycle time), AP 202 may transmit or receive during one or more service periods 208 that comprise the beacon period 206. For example, service periods 208 may span 1 millisecond or some other time during which one or more transmissions may be made. A cycle time is a parameter that may be configured based on a service and/or latency requirements of one or more applications. For example, an STA application may generate packets in a synchronous/periodic pattern (e.g., of 1 millisecond cycles), and packets generated at the beginning of a cycle may need to be delivered within the cycle.

In some embodiments, AP 202 may send a control frame, such as a beacon 210 during a service period 208 at the beginning of beacon period 206. During TXOP 212, TXOP 214, TXOP 216, TXOP 218, TXOP 220, TXOP 220, TXOP 222, and TXOP 224, AP 202 may send or receive frames to/from TSN device 204. At the conclusion of beacon period 206, a new beacon period may begin with AP 202 sending beacon 226. In some embodiments, the control frame may be a trigger frame. In these embodiments, the control frame may be used to initiate a sequence of multiple transmissions within a period that repeats, as further described herein.

In some embodiments, any of TXOP 212, TXOP 214, TXOP 216, TXOP 218, TXOP 220, TXOP 220, TXOP 222, and TXOP 224 may include restricted or unrestricted service periods, time sensitive service periods, or non-time sensitive service periods. TXOP 212, TXOP 214, TXOP 216, TXOP 218, TXOP 220, TXOP 220, TXOP 222, and TXOP 224 may comprise one or more service periods 208.

It is understood that the above descriptions are for purposes of illustration and are not meant to be limiting.

Figure 3A:
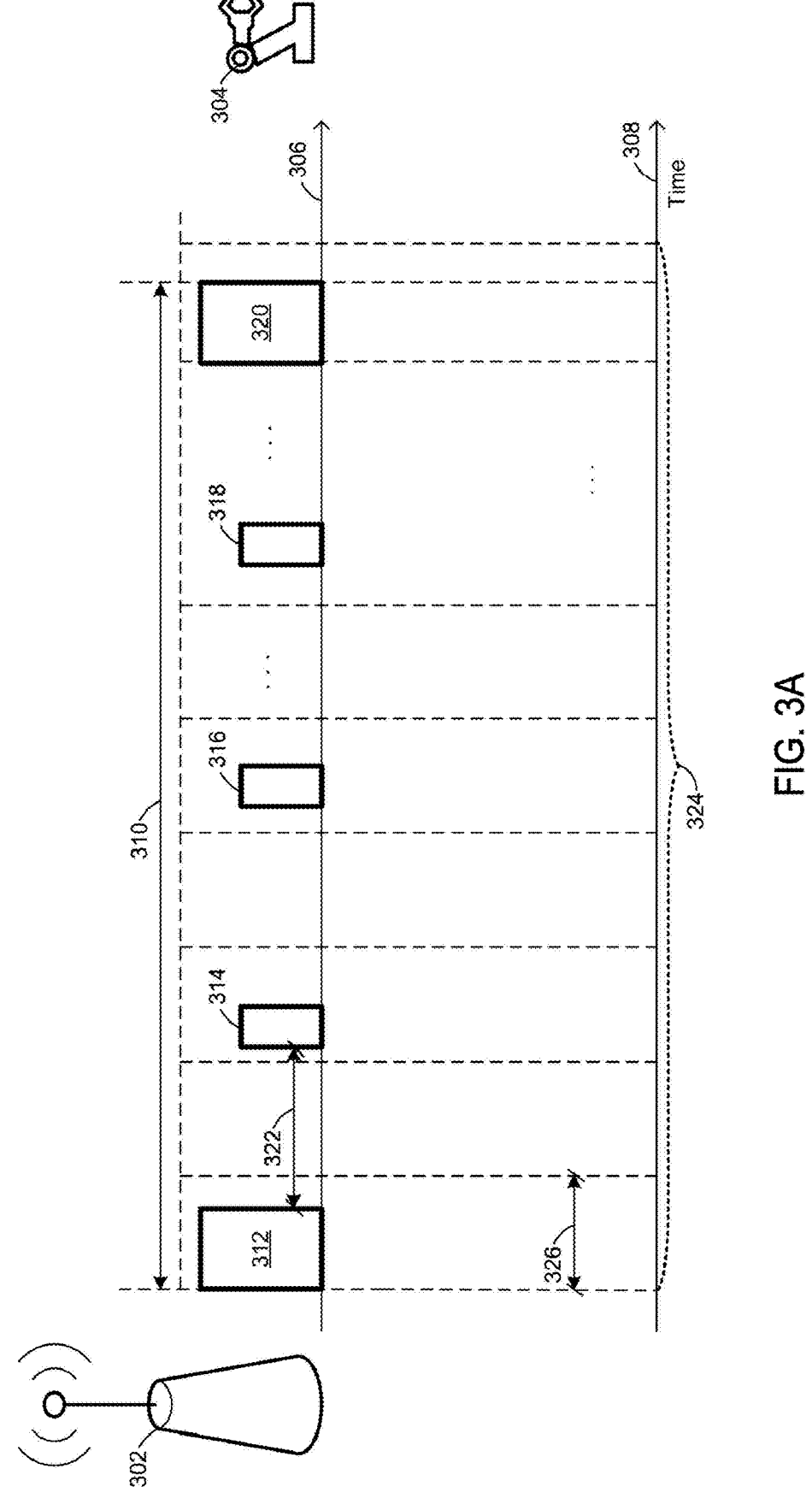
FIG. 3A illustrates a control channel access sequence, in accordance with some embodiments.

FIG. 3A illustrates an control channel access sequence 300, in accordance with some embodiments. In some embodiments, AP 302 may be a WTSN device (e.g., WTSN device 150 of FIG. 1B) in communication with STA 304, which may be another WTSN device. AP 302 and STA 304 may use a TSCCH 306 and a TSDCH 308 to transmit both control/management frames and data frames.

In some embodiments, a beacon period 310 (e.g., 100× cycle time) may begin with AP 302 sending beacon 312. Later in beacon period 310, AP 302 may send short beacon 314, short beacon 316, short beacon 318, or any number of short beacons supported by the beacon period 310. At the end of beacon period 310, another beacon 320 may be sent by AP 302. Beacon 312, short beacon 314, short beacon 316, short beacon 318, and/or beacon 320 may provide control/management frames to STA 304 in TSCCH 306.

In some embodiments, TSCCH 306 and TSDCH 308 may be divided into cycles 324 which may span a cycle time 326 (e.g., 1 ms). Beacon 312, short beacon 314, short beacon 316, short beacon 318, and/or beacon 320 may not require an entire cycle 324.

In some embodiments, TSCCH 306 and TSDCH 308 may be logical channels defined within an existing or new physical channel/frequency band. TSCCH 306 may be defined within a primary channel, while TSDCH 308 may be defined in a secondary or dedicated TS channel, possibly in another frequency band. TSCCH 306 may be used for time sensitive access under control of AP 302. TSDCH 308 may be defined in an existing or new band (e.g., 6-7 GHz).

In some embodiments, configurations for TSCCH 306 and/or TSDCH 308 may be transmitted as information elements in beacon 312, short beacon 314, short beacon 316, short beacon 318, and/or beacon 320. The configurations may provide information identifying the corresponding physical channels used for TSCCH 306 and TSDCH 308.

In some embodiments, TSCCH 306 may be defined as periodic resources (e.g., time-frequency slots) for exchanging control frames. Defining a periodic interval for control frames may be important to enable time sensitive STAs (e.g., STA 304) to schedule time sensitive data and control actions without conflicts (e.g., conflicts with other devices).

In some embodiments, TSCCH 306 may be used to transmit regular beacons (e.g., beacon 312, beacon 320) and short beacons (e.g., short beacon 314, short beacon 316, short beacon 318), which may include a subset of information transmitted of regular beacons (e.g., an updated transmission schedule or bitmap of restricted time sensitive service periods). Short beacon transmissions may be scheduled in predefined intervals (e.g., fractions of beacon period 310). Other management frames may also be transmitted in TSCCH 306, such as association request/response frames, timing measurements, and channel feedback measurement frames.

In some embodiments, access to TSCCH 306 may use contention-based TSN sequence 300. Contention-based TSN sequence 300 may follow a legacy carrier-sense multiple access (CSMA)-based IEEE 802.11 MAC protocol. For example, when TSCCH 306 is defined as the operating/primary channel, AP 302 may contend for TSCCH 306 using enhanced distributed channel access (EDCA) to transmit beacon (e.g., beacon 312, beacon 320) and short beacons (e.g., short beacon 314, short beacon 316, short beacon 318) at predefined intervals. TSCCH control frames (e.g., beacon 312, short beacon 314, short beacon 316, short beacon 318, and/or beacon 320) may include information to support a time synchronized scheduled access in TSDCH 308. Such operation may enable time sensitive operations for legacy Wi-Fi systems in which TSCCH 306 may provide an anchor for TSDCH 308 (e.g., time synchronized and schedule) in one or more restricted channels and/or frequency bands.

In some embodiments, access to TSCCH 306 may use a time-synchronized access method. TSCCH 306 may be defined as periodic scheduled resources (e.g., time slots) for regular beacons (e.g., beacon 312, beacon 320) and short beacons (e.g., short beacon 314, short beacon 316, short beacon 318) using time-synchronized access. Access to time slots (e.g., cycles 324) may still be based on contention (e.g., CSMA) or may be scheduled. For example, slots may be reserved for beacons and short beacons, which may be transmitted periodically (e.g., every fifth slot). TSCCH 306 may also be aligned with TSDCH 308 timing. TSCCH time slots reserved for beacons and/or short beacons may be announced in regular beacons so that newly admitted STAs (e.g., STA 304) may discover TSCCH 306 parameters. All STAs may be required to adhere to time synchronization across channels and ensure TXOPs do not overlap with scheduled TSCCH slots. In addition, all STAs may be required to listen to TSCCH 306 during scheduled beacon/short beacon slots to make sure the STAs receive those beacons/short beacons. Such operation may provide a more deterministic operation as timing of each TSCCH 306 may be controlled and collisions may be avoided through efficient scheduling.

In some embodiments, remaining time of TSCCH slots (e.g., cycles 324) occupied by a beacon/short beacon may be used to exchange other control/management frames. In some embodiments, AP 302 may transmit unicast control/management frames to STA 304 using TSDCH 308 provided that the control/management frames do not interfere with time sensitive data.

It is understood that the aforementioned example is for purposes of illustration and not meant to be limiting.

Figure 3B:
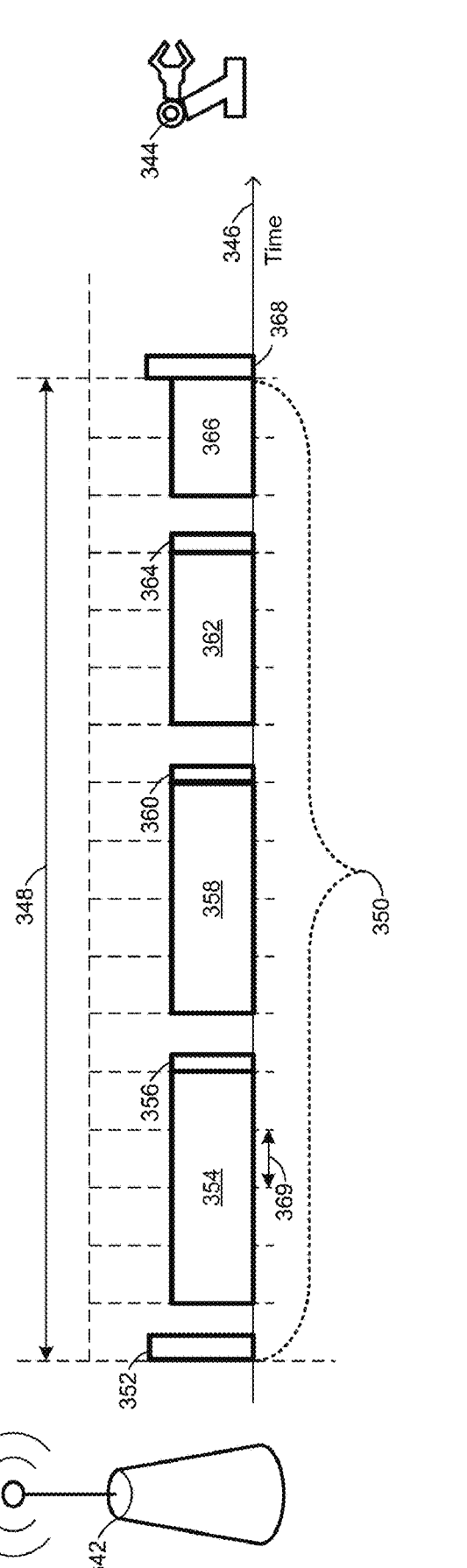
FIG. 3B illustrates a combined channel access sequence, in accordance with some embodiments.

FIG. 3B illustrates an combined channel access sequence 340, in accordance with some embodiments. In some embodiments, AP 342 may be a WTSN device (e.g., WTSN device 150 of FIG. 1B) in communication with STA 344, which may be another WTSN device. AP 342 and STA 344 may use channel 346 to transmit both control/management frames and data frames.

In some embodiments, a beacon period 348 (e.g., 100× cycle time) having one or more cycles 350 may begin with AP 342 sending beacon 352. Later in beacon period 348, AP 342 and/or STA 344 may send one or more data frames 354. AP 342 may send short beacon 356. AP 342 and/or STA 344 may send one or more data frames 358. AP 342 may send short beacon 360. AP 342 and/or STA 344 may send one or more data frames 362. AP 342 may send short beacon 364. AP 342 and/or STA 344 may send one or more data frames 366. After beacon period 348 has concluded, AP 342 may send another beacon 368 to begin another beacon period. The beacons (e.g., beacon 352, short beacon 356, short beacon 360, short beacon 364, and beacon 368) may be sent in channel 346. The one or more data frames (e.g., one or more data frames 354, one or more data frames 358, one or more data frames 362, and one or more data frames 366) may be sent in the channel 346.

In some embodiments, channel 346 may be divided into cycles 350 which may span a cycle time 369 (e.g., 1 ms). Beacon 352, short beacon 356, short beacon 360, short beacon 364, and beacon 368 may not require an entire cycle 350. The one or more data frames (e.g., one or more data frames 354, one or more data frames 358, one or more data frames 362, and one or more data frames 366) may use one or more cycles 350 and may use partial cycles 350.

In some embodiments, channel 346 may be a physical channel that includes a TSCCH and TSDCH. Using cycles 350, control/management frames (e.g., beacon 352, short beacon 356, short beacon 360, short beacon 364, and beacon 368) and data frames (e.g., one or more data frames 354, one or more data frames 358, one or more data frames 362, and one or more data frames 366) may be scheduled to avoid overlapping/conflicting transmissions. Such enhanced coordination may facilitate WTSN communications which meet the latency and reliability requirements of WTSN operations.

It is understood that the aforementioned example is for purposes of illustration and not meant to be limiting.

Figure 3C:
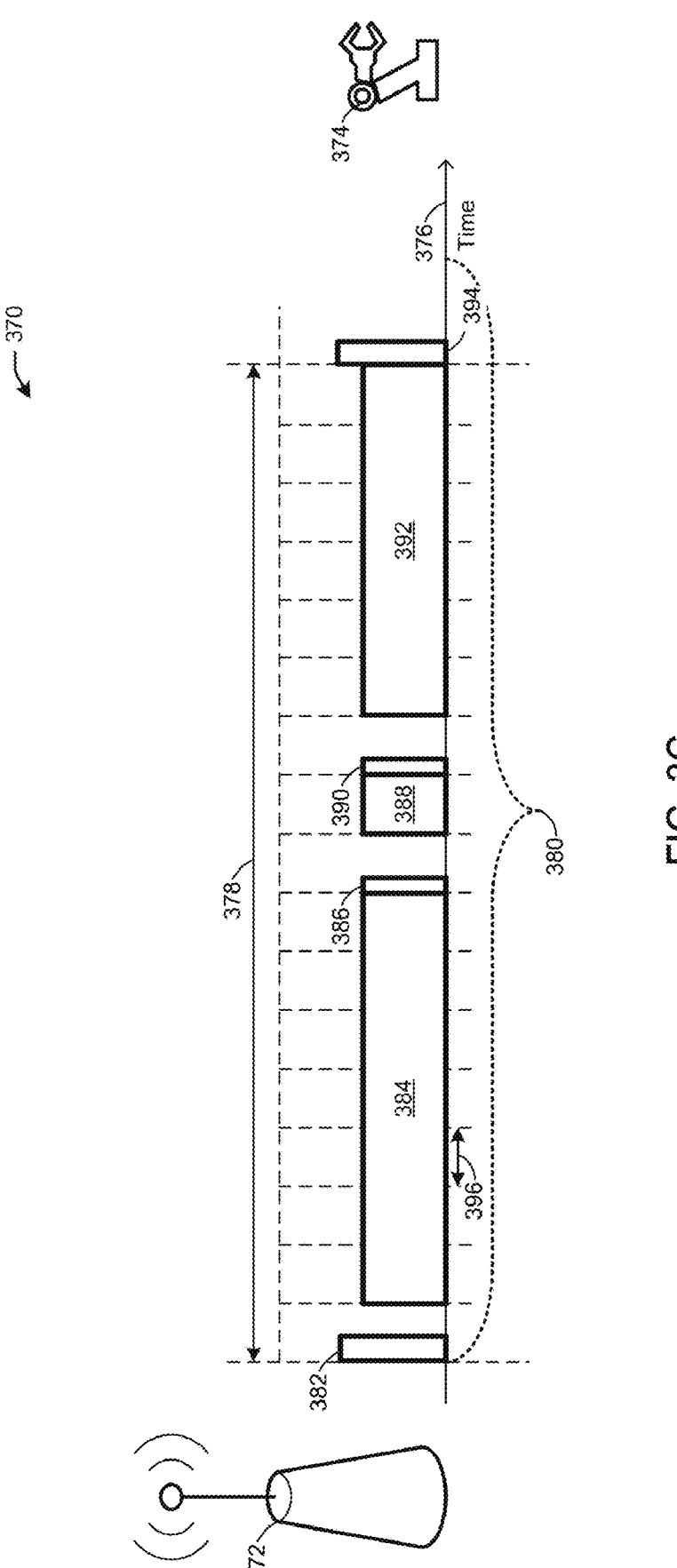
FIG. 3C illustrates an on-demand channel access sequence, in accordance with some embodiments.

FIG. 3C illustrates an on-demand channel access sequence 370, in accordance with some embodiments. In some embodiments, AP 372 may be a WTSN device (e.g., WTSN device 150 of FIG. 1B) in communication with STA 374, which may be another WTSN device. AP 372 and STA 374 may use channel 376 to transmit both control/management frames and data frames.

In some embodiments, a beacon period 378 (e.g., 100× cycle time) having one or more cycles 380 may begin with AP 372 sending beacon 382. Later in beacon period 378, AP 372 and/or STA 374 may send one or more data frames 384. AP 372 may send short beacon 386. AP 372 and/or STA 374 may send one or more data frames 388. AP 372 may send short beacon 390. AP 372 and/or STA 374 may send one or more data frames 392. After beacon period 378 has concluded, AP 372 may send another beacon 394 to begin another beacon period. The beacons (e.g., beacon 382, short beacon 386, short beacon 390, and beacon 394) may be sent in channel 376. The one or more data frames (e.g., one or more data frames 384, one or more data frames 388, and one or more data frames 392) may be sent in the channel 376.

In some embodiments, AP 372 may send control/management frames (e.g., beacon 382, short beacon 386, short beacon 390, and beacon 394) on demand using resources such as time slots (e.g., cycles 380) that may not be reserved for time sensitive data.

It is understood that the aforementioned example is for purposes of illustration and not meant to be limiting.

Emerging time-sensitive (TS) applications represent new markets for Wi-Fi. Industrial automation, robotics, augmented reality (AR)/virtual reality (VR) and HMIs (Human- Machine Interface) are example applications. IEEE TSN (Time-Sensitive Networking) standards are being extended over Wi-Fi and 5G to provide the determinism required by many applications in industrial, enterprise and consumer domains. TSN features over Wi-Fi will need more efficient scheduling capabilities from the 802.11 MAC. Although 802.11ax has introduced new triggered-based OFDMA operation, the overhead involved in the basic trigger-based data exchange within a TXOP is high, especially for small packet sizes. Many time-sensitive applications involve iso-chronous (cyclic) transmission of small packets (typically a few bytes) within very short cycles with high reliability. Embodiments disclosed herein utilize a Synchronized Transmission Opportunity (S-TXOP).

Example embodiments of the present disclosure relate to systems, methods, and devices for a Mechanism to Signal Configuration and Resource Allocation inside a S-TXOP. This disclosure describes resource allocation and configuration signaling enhancements for the S-TXOP including:

A mechanism to signal S-TXOP configuration options in a beacon or other management frames and associate S-TXOP with restricted TWT service periods.

A STA info list field including scheduling information for STAs within each S-TXOP slot.

Signaling to indicate/enable or disable semi-static scheduling configuration within a S-TXOP.

DL-SIG field for DL slots within a S-TXOP.

UL slot control signaling and configuration options.

The proposed enhancements will enable a more efficient configuration and management of network resources within the S-TXOP with better performance (e.g. lower latency and higher efficiency) and protection from interference from other STAs.

Figure 4A:
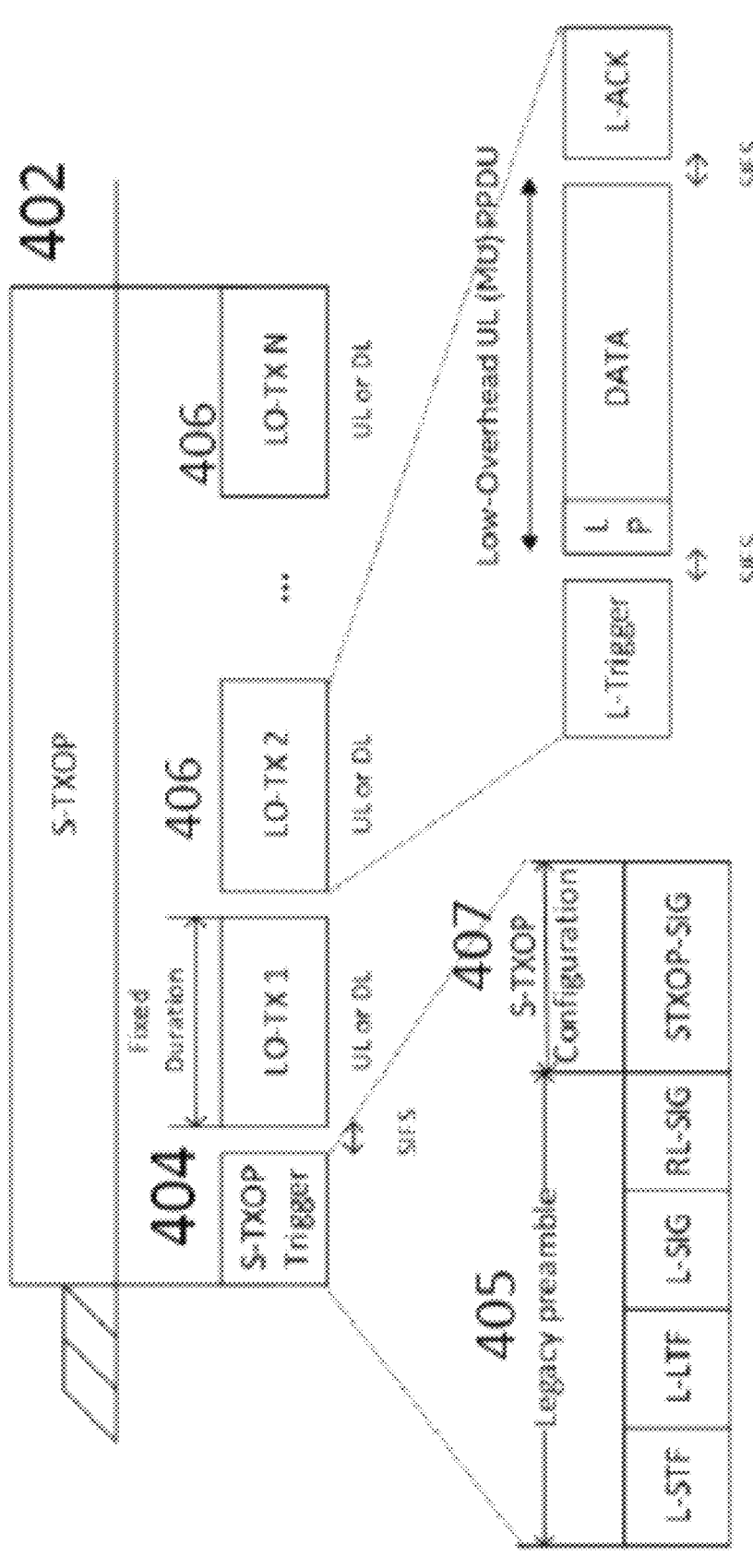
FIG. 4A illustrates a synchronous transmission opportu-nity (S-TXOP), in accordance with some embodiments.

FIG. 4A illustrates an synchronous transmission opportunity (S-TXOP) 402, in accordance with some embodiments. FIG. 4A describes the detailed frame formats for enabling an S-TXOP 402 in a compatible way with legacy Wi-Fi (802.11ax). The specific signaling options to communicate S-TXOP configurations and detailed resource allocation between AP and STAs are described in more detail herein.

As shown in FIG. 4A, S-TXOP 402 may include an S-TXOP trigger 404 for transmission at a beginning of the S-TXOP 402 followed by a plurality of slots 406. The S-TXOP trigger 404 may include a legacy preamble 405 and optionally a S-TXOP configuration field 407. The S-TXOP configuration field 407 may include a number of slots and a duration. In these embodiments, to reduce overhead for coexistence, a first transmission in the S-TXOP 402 may comprise a legacy preamble 405 for enabling coexistence with legacy devices.

S-TXOP Synchronization: STAs may use the S-TXOP trigger 404 (S-TXOP trigger frame (TF)) to synchronize to the AP for the whole S-TXOP time and only a minimum synchronization/AGC correction may be provided in each low overhead PPDU.

Configuration Signalling: Configuration information and resource allocation for the N transmissions opportunities within the S-TXOP.

Lite Trigger (L-Trigger): A low overhead trigger frame to provide/update resource allocations. It includes only the Light Preamble and a field for UL resource allocations.

Lite Preamble: Small Preamble (one OFDM Symbol) carried by a Low Overhead PPDU to enable STAs to correct small timing/frequency jitter that may occur between DL/UL transitions with the S-TXOP. It does not carry the legacy preamble (L-STF, L-LTF, L-SIG, RL-SIG).

Lite-ACK: A low overhead ACK including only the lite preamble and an ARQ bitmap. Normal ACK may also be used.

Some S-TXOP parameters may be configured for all the STAs in the BSS, such as maximum/minimum durations per slot, configuration options for slots (e.g., short trigger vs regular trigger for UL slots). Such configurations may be included in beacon frames or probe response frames.

Figure 4B:
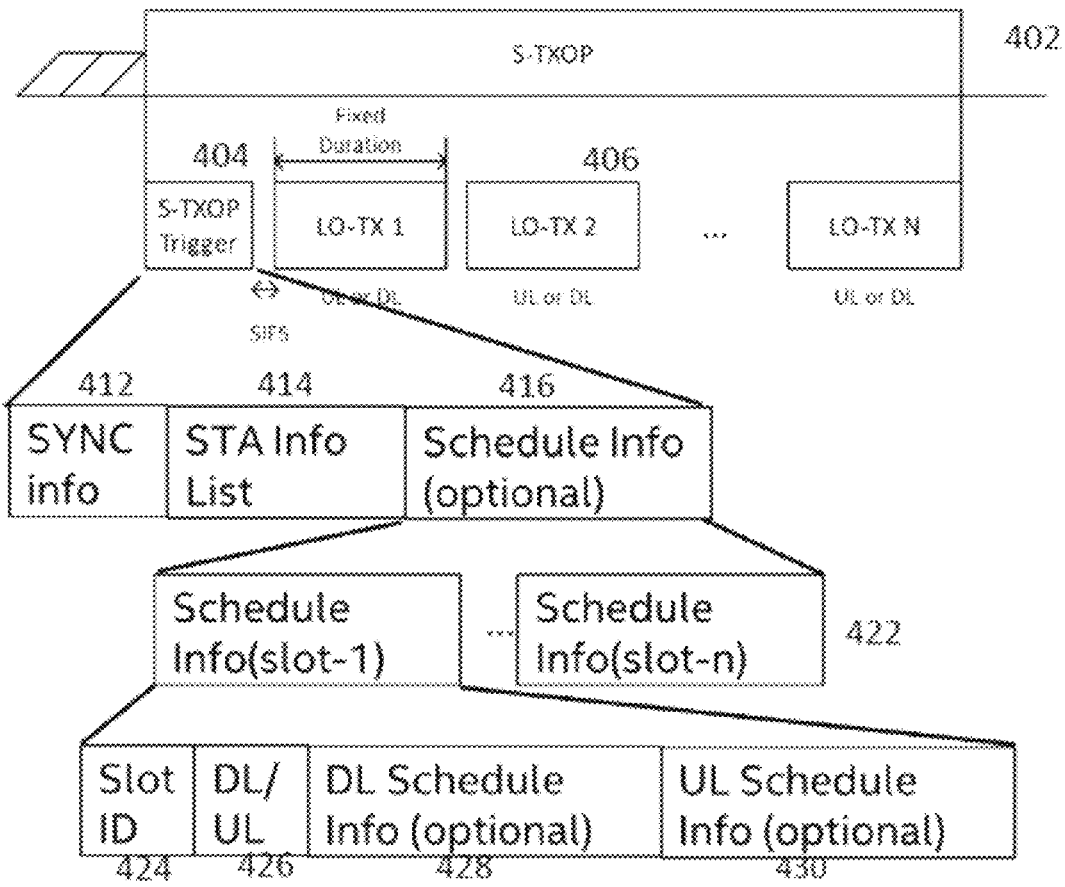
FIG. 4B illustrates S-TXOP initial configuration and resource allocation signaling, in accordance with some embodiments.

FIG. 4B illustrates S-TXOP Initial Configuration and Resource Allocation signaling, in accordance with some embodiments.

The SYNC info field 412 enables PHY level synchronization.

STA Info List 414: For each STA that is going to be addressed in this S-TXOP the following information is included:

The AID.

The slots these STAs are going to participate in, signaled as:

Bitmap or index of a feasible allocation configured apriori (e.g., during r-TWT setup).

2 bits to signal if semi-static config is enabled, disabled one or if configuration continues from previous S-TXOP.

Schedule Info 416 contains a list 422 of schedule information for a subset of slots including:

Slot ID 424

DL/UL bit 426 or a 2 bit DL/UL/flexible signaling.

Scheduling IE for DL, UL or P2P:

The DL Schedule Info 428 contains equivalent of/compressed U-SIG+EHT-SIG information that's carried in MU PPDU.

UL Schedule Info 430 contains equivalent of/compressed Basic Trigger Frame information.

Some optimizations can be done e.g., by using index of the STA in the STA Info list instead of AID, getting rid of information that's not useful.

No Schedule Info if corresponding to a slot in which only STAs that are configured in semi-static fashion participate.

No DL Schedule Info or UL schedule info if the config is known apriori.

For transmission in slots that are not mentioned in Schedule Info the resource allocation is signaled in the slot (e.g., via a U-SIG or equivalent for DL and TF or short TF in UL).

Figure 4C:
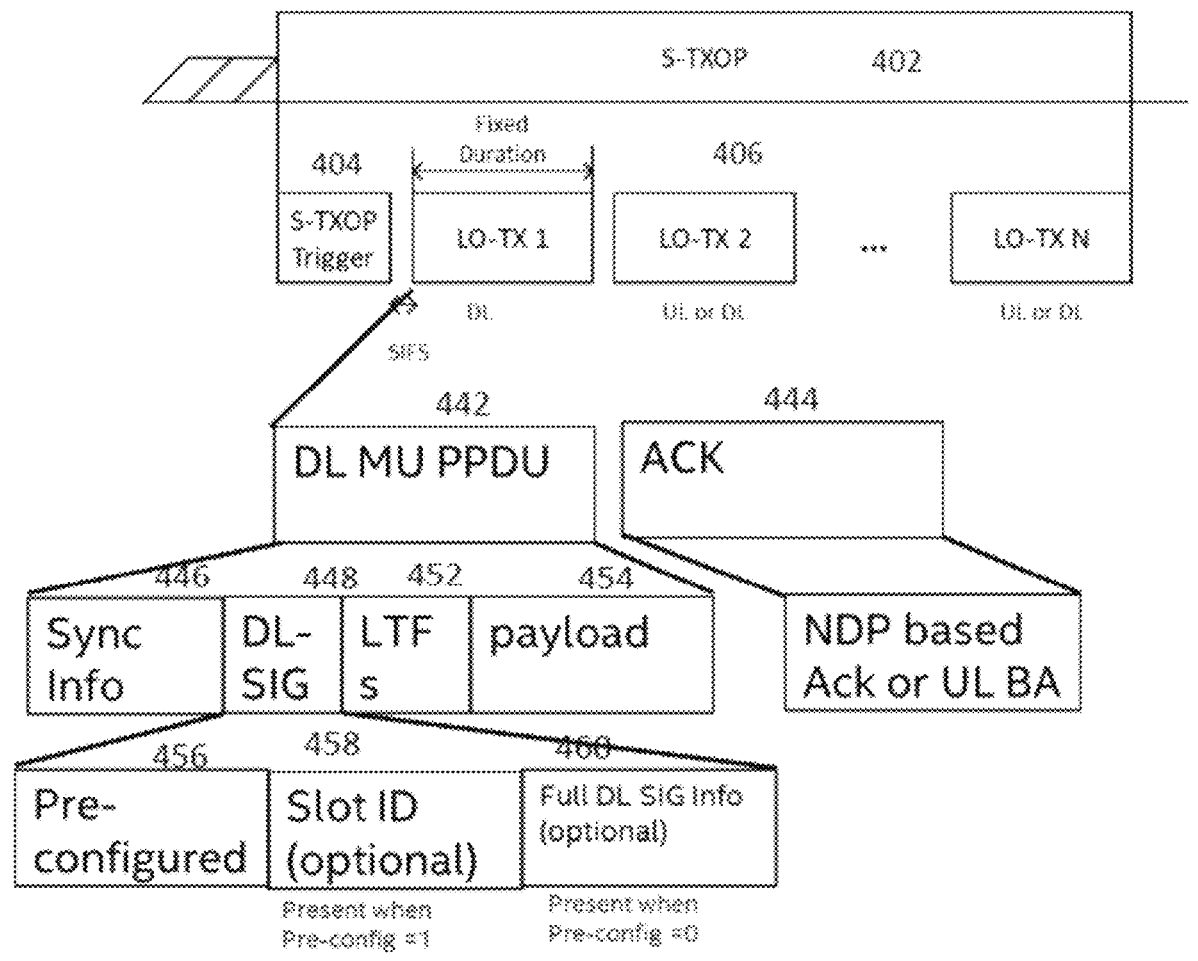
FIG. 4C illustrates an S-TXOP downlink (DL) slot con-figuration, in accordance with some embodiments.

FIG. 4C illustrates an S-TXOP DL Slot Configuration, in accordance with some embodiments. The SYNC info field 446 enables PHY level synchronization for the DL slot that includes DL MU PPDU 442. In a given slot for a DL transmission a Pre-Configured Bit 456 is included in the DL-SIG 448. If the bit is set to 1, then this signals the allocation was done apriori and the Slot ID field 458 is present as reference to the exact resource allocation. Otherwise, the complete resource allocation information that would typically be present in a baseline DL PPDU (or equivalent) is included (as field 460).

In some embodiments, for a DL slot, the DL MU PPDU 442 may be encoded to include a synchronization field 446 prior to the DL-SIG 448, an LTF 452 following the DL-SIG 448 followed by a payload 454, although the scope of the embodiments is not limited in this respect. ACK 444 may follow the DL MU PPDU 442.

Figure 4D:
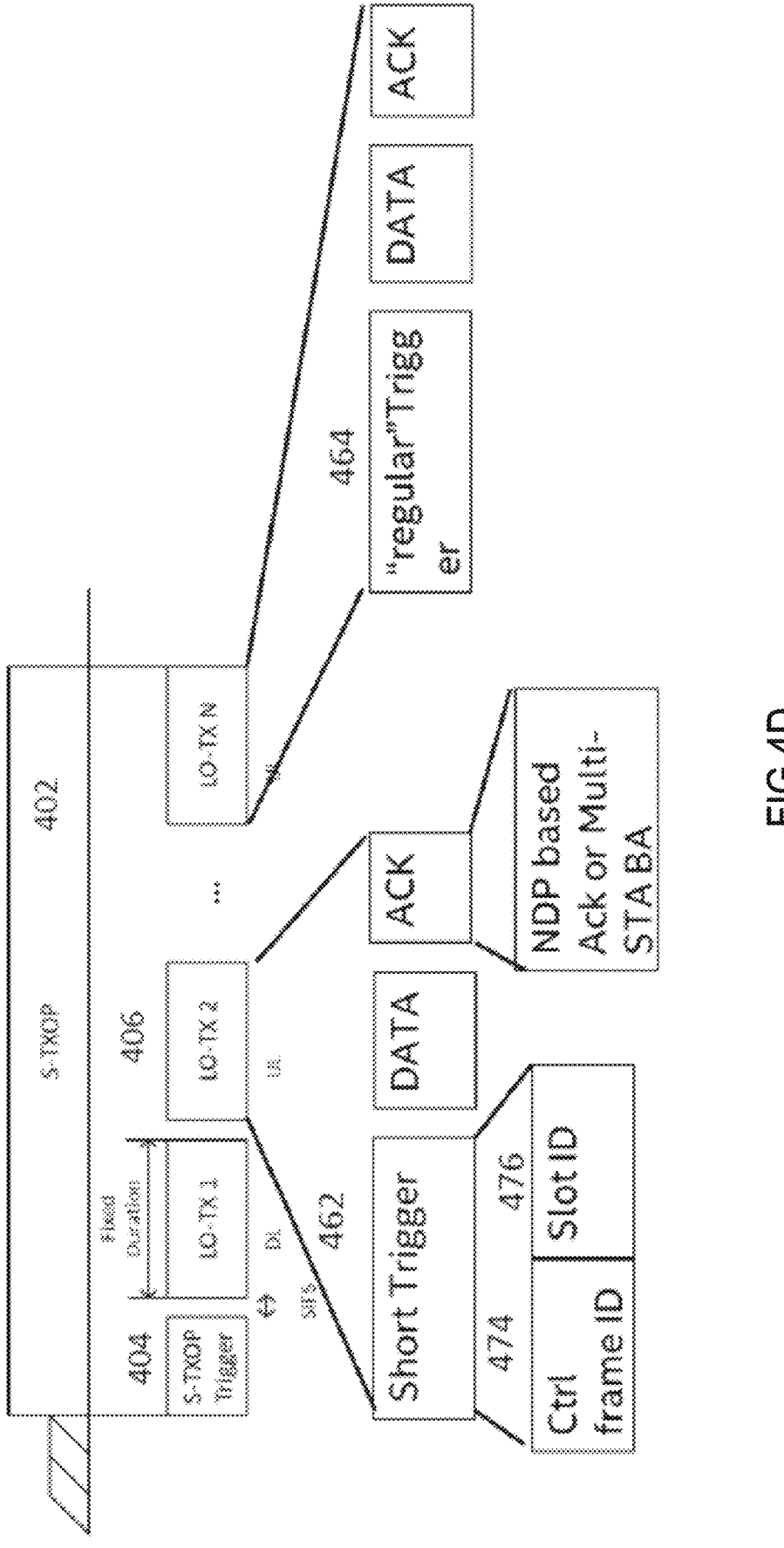
FIG. 4D illustrates an S-TXOP uplink (UL) slot configu-ration, in accordance with some embodiments.

FIG. 4D illustrates an S-TXOP UL Slot Configuration, in accordance with some embodiments. In a given slot for a UL transmission either a Short Trigger 462 is included if the allocation was signaled apriori or a regular Trigger frame 464 otherwise. The Short Trigger can be a new Ctrl frame 474 or a new NDP PPDU. It contains a Slot ID 476 which acts as a pointer to the exact resource allocation.

Figure 5A:
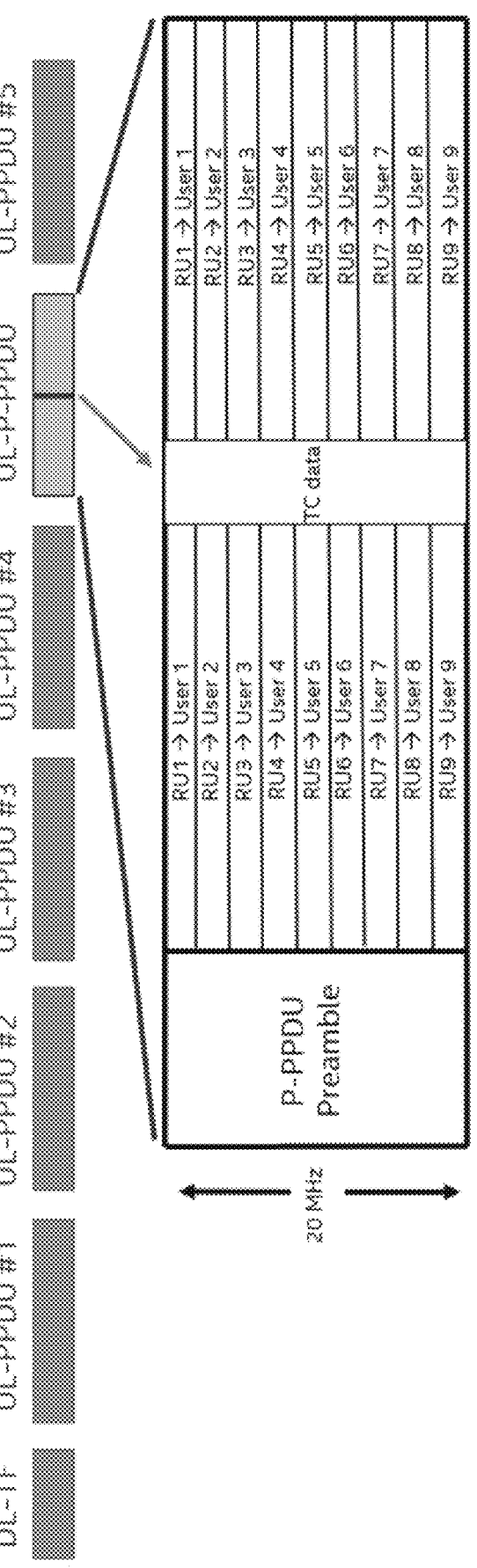
FIG. 5A illustrates a preemptable uplink physical-layer protocol data unit (UL PPDU) in accordance with some embodiments.

Providing transmission opportunities for small TC packets in Wi-Fi with high efficiency is an open challenge, which is being considered within the scope of Wi-Fi 8. Solutions may be grouped in two main categories: Frame Preemption and Scheduled Transmissions. In frame preemption, existing transmissions are interrupted to prioritize a TC packet transmission which may use preemptable UL/DL PPDUs or a transmission is interrupted to prioritize a small TC packet. In scheduled transmissions, scheduling transmissions are enhanced with reduced overhead as part of the Synchronized Transmission Opportunity (S-TXOP). FIG. 5A illustrates a preemptable uplink physical-layer protocol data unit (UL PPDU) in accordance with some embodiments.

In a practical deployment, such as industrial IOT enterprises, small TC packets that need ULL (10's to 100's of microseconds) are expected to be a small fraction of the overall traffic, and several STAs may generate such TC packets (e.g. PLCs) and they need to and share the same Wi-Fi network with many other time-sensitive and best effort applications with different low latency (e.g., single digit to 10's of milliseconds), reliability, and throughput requirements. The small TC packets may be part of isochronous (time synchronized fully scheduled flows) or they may be generated asynchronously (asynchronous transmissions as response to events, alerts, . . . ). Scheduled optimizations as provided by the S-TXOP are a good approach to address isochronous ULL requirements. On the other hand, scheduling/reserving dedicated resources for such asynchronous high priority traffic on periodic basis may lead to inefficiencies. Although preemption can enable ULL, interrupting ongoing transmissions may cause degradation of the overall efficiency if the feature is overused or enabled in an ad-hoc fashion. Granular scheduling opportunities as enabled by the S-TXOP can enable more determinism and low latency with higher efficiency, but the S-TXOP design can be enhanced to enable a mix of deterministic semi-static scheduled and asynchronous opportunities for very small TC packets that need ULL.

Some embodiments disclosed herein provide optimizations to the S-TXOP design to enable efficient transmission of asynchronous small TC packets with ULL with minimal overhead. Some embodiments may adapt some of preemption capabilities and may utilize other S-TXOP enhancements.

Figure 5B:
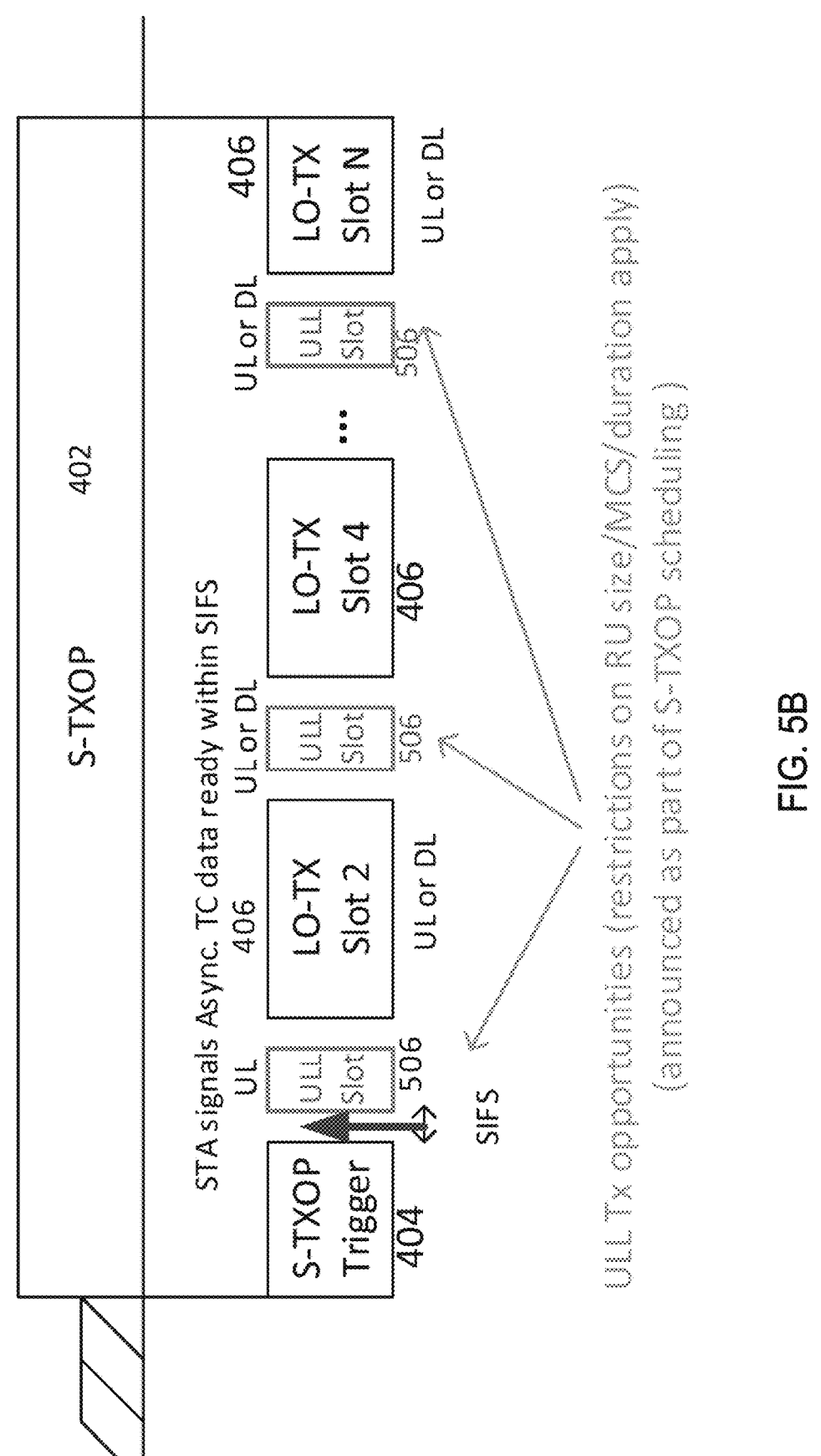
FIG. 5B illustrates an S-TXOP with ULL transmission opportunities using flexibly slot sizes in accordance with some embodiments.

Some embodiments disclosed herein describe resource allocation and configuration signaling enhancements for the S-TXOP to support a mix of synchronous and asynchronous small TC packets with other low latency and best effort applications. These embodiments include three resource allocation options and an asynchronous signaling method for the STAs to indicate the TC data is available:

Resource Allocation (Option 1): Asynchronous ULL transmissions are enabled as sub-set of S-TXOP slots only for certain STAs that have asynchronous ULL requirements. The ULL slots are slots optimized for short TC packet transmissions meeting the ULL requirements (e.g., using lite-preamble and optimized semi-static allocations). The ULL slots are advertised at the beginning of the S-TXOP and their periodicity can be adjusted based on latency requirements and efficiency tradeoffs. Resource allocation and configuration for using asynchronous transmissions within ULL slots may also be done a priori to enable minimal overhead. FIG. 5B illustrates an S-TXOP with ULL transmission opportunities using flexibly slot sizes in accordance with some embodiments.

Figure 5C:
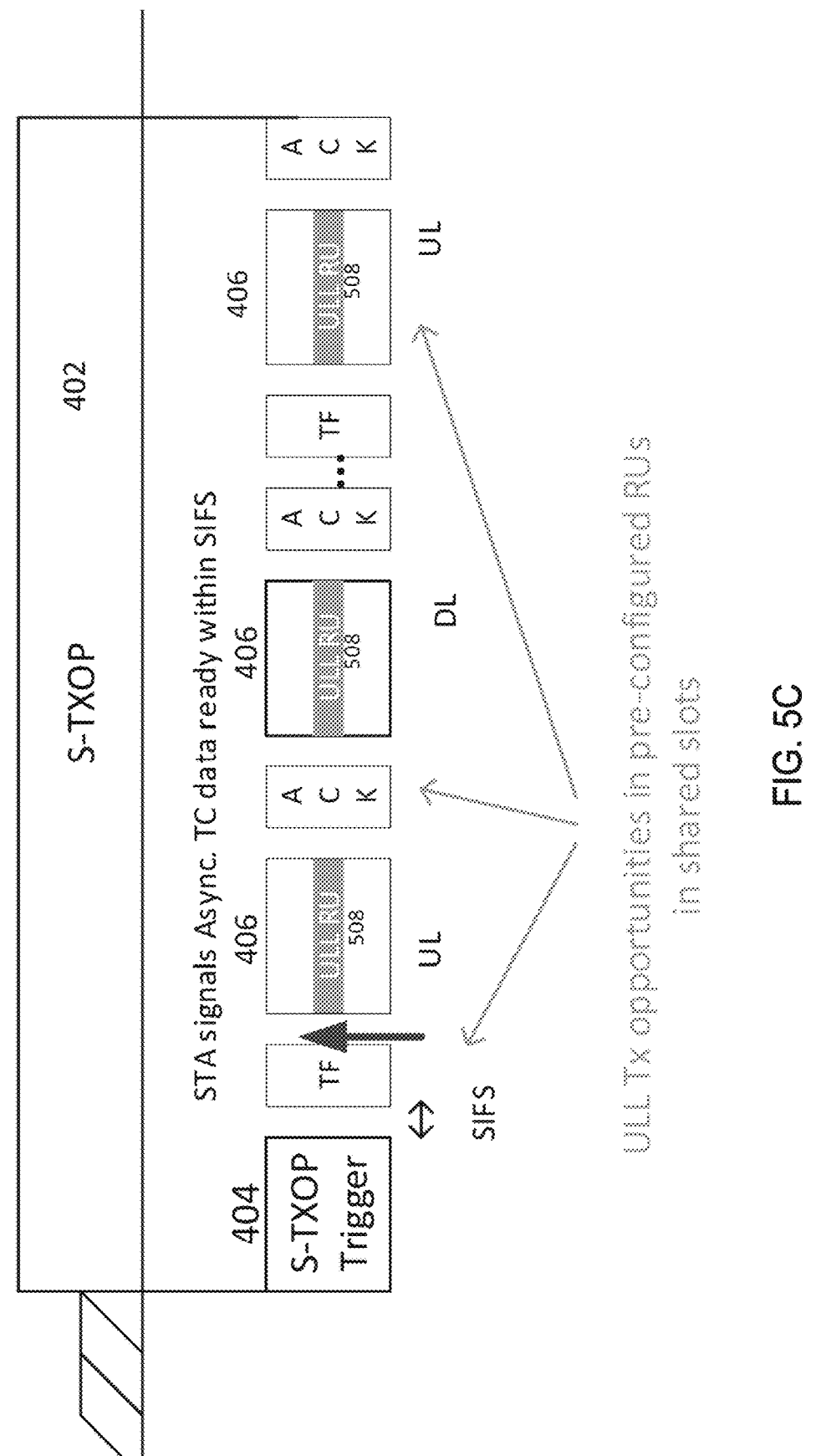
FIG. 5C illustrates an S-TXOP with asynchronous ULL transmission opportunities in pre-configured RUs in UL/DL slots in accordance with some embodiments.

Resource Allocation (Option 2): Asynchronous ULL transmissions using reserved resources, such as specific RUs from existing defined RU or new RU constructed with NULL tones in UL/DL PPDUs within the S-TXOP UL/DL slots. In this mode, UL ULL transmissions are only allowed in UL slots and DL ULL transmissions only happens on DL slots. This option may use the capability to transmit small ULL data in the dedicated RU constructed with null tones of the PPDU, which will have no effect to existing data transmission or spectrum efficiency loss. FIG. 5C illustrates an S-TXOP with asynchronous ULL transmission opportunities in pre-configured RUs in UL/DL slots in accordance with some embodiments.

Figure 5D:
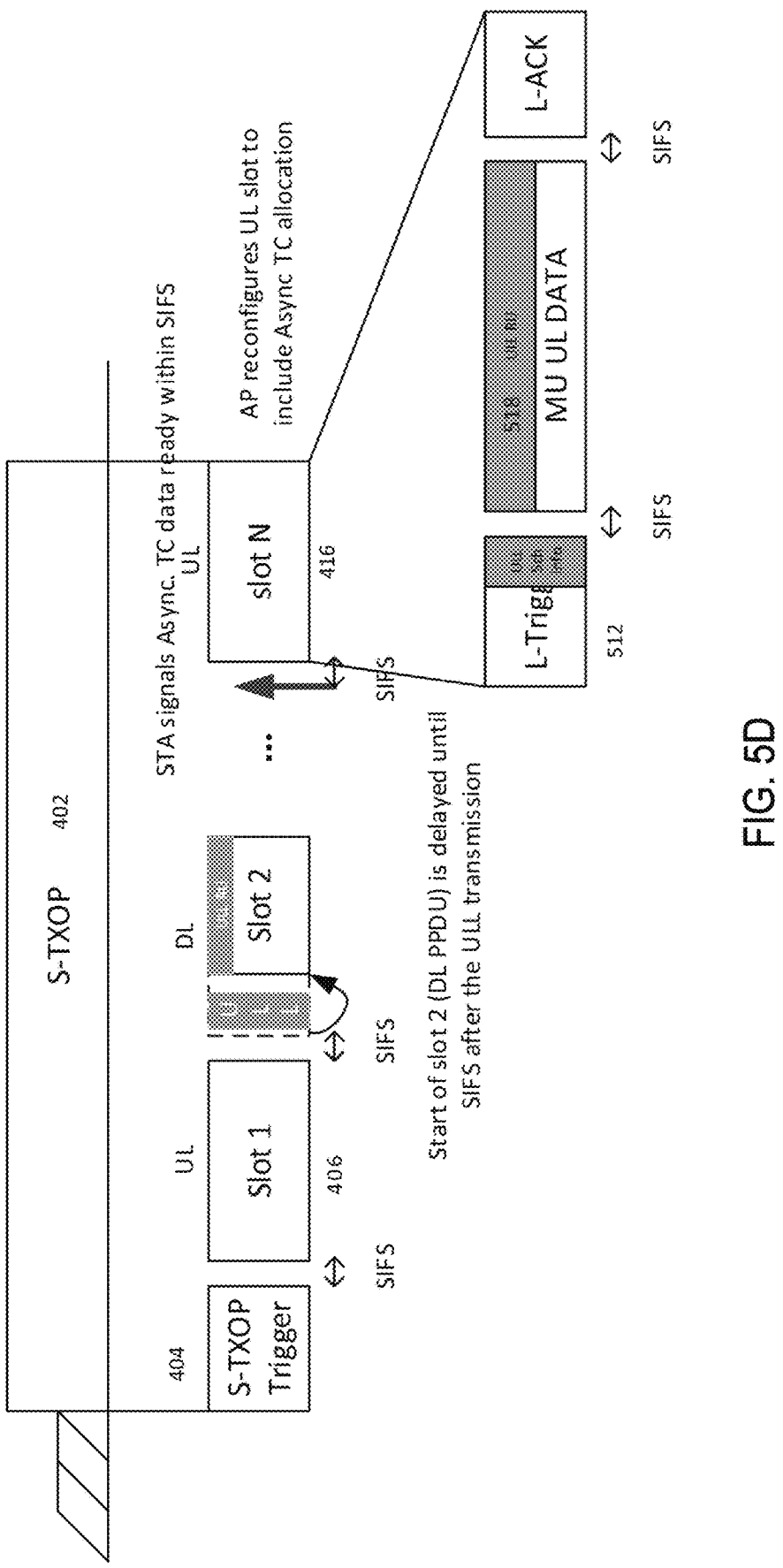
FIG. 5D illustrates flexible resource allocation for mixed traffic in S-TXOP slots in accordance with some embodi-ments.

Resource Allocation (Option 3): Asynchronous ULL transmissions are enabled on demand by signaling in the lite-trigger frame within UL slots, preempting/delaying the DL PPDUs in a DL slot or providing specific allocations within DL PPDUs. The allocation for such transmissions may be pre-defined (as dedicated RU in option 2) or signed by the AP (in DL control information or included in the lite-trigger frame for UL slots). In this mode, UL/DL ULL transmissions may occur in any slot (no restriction on UL/DL slots). FIG. 5D illustrates flexible resource allocation for mixed traffic in S-TXOP slots in accordance with some embodiments.

STA UL signaling of ULL TC data available to use ULL Resource: STAs that need to use the ULL resources signal the availability of asynchronous ULL TC packets within the time between the end of the previous slot and the start of the next slot (SIFS time). The STA signaling is shown as an arrow in FIG. 5D. This signaling may be based on the Zadoff-Chu sequence and allows the AP to receive the signaling information within SIFS time and also solve conflicts between multiple STAs that may have a TC packet to send. Once receiving the signaling the AP can provide additional allocation information and adjust the ULL resources to meet the demand from STAs in one of the following slots.

The proposed enhancements described herein will enable a more efficient configuration and management of network resources within the S-TXOP with better performance supporting a mix of synchronous and asynchronous traffic with ultra-low latency and high efficiency. S-TXOP and ULL transmissions are capabilities enabled in a managed network environment where interference from overlapping BSSs can be managed and minimized by applying other tools (e.g., frequency planning, restricted TWT, etc.). TC data that requires 10's to 100's of microsec latency may be limited to a few bytes (<100 Bytes) and only a small fraction of devices in the network will have such requirements.

Resource Allocation Option 1: Dedicated ULL Slots within the S-TXOP

In this option, certain slots may be preconfigured to be used for asynchronous TC data transmissions. The slots may be configured as UL or DL slots. The schedule of ULL slots may be announced in the S-TXOP trigger. It may also be included in other management frames used for configuring the required PHY parameters and resources for transmissions of TC frames within the reserved ULL slots. Some restrictions may apply to such slots, including RU size, MCS required and maximum payload size. In one embodiment, resource allocation within the slot may be included in the lite-trigger frame for UL slots or DL PPDU. If the number of STAs that are allowed to use the ULL slots within the BSS is small, resource allocation for the dedicated ULL slots may also be done a priori (semi-statically), using management frames. The ULL slot information may be included in the S-TXOP trigger as shown in FIG. 5F which illustrates enhanced S-TXOP scheduling information for ULL mode, in accordance with some embodiments.

In these embodiments, the ULL slot information may include:

ULL Slots bitmap: indicates the slots within the S-TXOP were ULL mode is enabled.

ULL Schedule Info may contain additional information for slots that enable the ULL mode:

ULL enabled bit: indicates that ULL mode is enabled in this slot.

ULL mode configuration: additional information describing any options for ULL transmissions (Options 1, 2, 3 or any combinations).

As with general scheduling information, the ULL information is not present when all STAs participating in the slot a are configured in semi-static fashion.

In one embodiment, the ULL slot may be common to all STAs with TC traffic i.e., any STA with such traffic can transmit within this slot. In one embodiment during the ULL slot if no transmission is detected (e.g., PHY-RXStart.indication) by the AP within sometime since the start of the slot (e.g., PIFS), then the AP considers absence of TC traffic and can reuse the remaining time for own transmissions. In one embodiment if multiple STAs are expected to participate in the ULL slot, they may use a short contention window to transmit packets. For e.g., STAs can re-draw a BO and obtain index n and defer for (((n−1)*slot duration)+SIFS). The AP may defer for (((max(n)−1)*slot duration)+SIFS) without detecting energy.

Resource Allocation Option 2: Dedicated RUs within Mixed Traffic Slots

Asynchronous ULL transmissions use reserved resources, such as specific RUs from existing defined RU or new RU constructed with NULL tones in UL/DL PPDUs within the S-TXOP UL/DL slots. This option may use this capability to transmit small ULL data in the dedicated RU constructed with the null tones of the PPDU. The availability of the ULL resources in a given slot may be signaled in the S-TXOP triggered (as in option 1 (see FIG. 5D)) and/or in beacons or other management frames. PHY configuration for using the ULL resources may also be previously negotiated (semi-statically) as in option 1, or it may be included in the signaling provided within the slot (lite-trigger or DL PPDU PHY signaling). The STAs allowed to use the reserved ULL slots must negotiate the service with the AP as part of the association or QoS set up procedures.

Resource Allocation Option 3: Flexible Resource Allocation within Mixed Traffic Slots In this option, slots can be used for ULL TC data as well as any other traffic scheduled by the AP. The S-TXOP trigger includes the information about which slots in which ULL transmissions are allowed, but those slots are not exclusive. For DL slots, the AP may transmit the TC data as part of a regular DL MU PPDU, or it may delay the start of the DL MU PPDU (expected for that slot) and transmit a TC data (as single or multi-user PPDU only for ULL STAs). The DL MU PPDU that would include semi-static allocations is delayed as shown FIG. 5D. In another embodiment, a DL PPDU may also be delayed allowing an UL ULL transmission within a DL slot. In this case, the STA provide signaling to the AP that the ULL TC is available using one of the methods described next. In the UL slots, the ULL TC data allocation information may be included in the lite-trigger frame and the AP can configure the resources (RUs) used for ULL TC data. In this way, multiple STAs can be served without conflict. In an alternative embodiment, the UL lite-trigger may also be delayed allowing the AP to send a DL ULL transmission in the UL slot.

STA UL Signaling of ULL TC Data Available to Use ULL Resource

When the ULL TC data is periodic, the existing S-TXOP scheduling mechanisms can be used to enabled ULL transmission in any of the previously described resource allocation modes. When the TC data must be sent in the DL direction, the AP may be aware of when the data becomes available, and it can use the S-TXOP scheduling mechanisms with the enhanced described herein for the different resource allocation options. One issue is when the ULL TC data is asynchronously (randomly) generated by the STAs. There is also the possibility that multiple STAs have data to send at the same time. Existing contention-based protocols are not desirable as they add randomness and overhead. A possible solution consists of enabling a short signaling in the UL direction without interfering with the main S-TXOP structure and timing. The ZC sequences are short and robust and can enable this signaling within the SIFS time between the slots. Additional receiver capabilities will be required at the AP to receive the new signaling.

Alternatively, a short (or lite) BSRP Trigger and BSR frames can be defined and transmitted at the beginning of each DL slot to determine if there are any ULL TC data from the STAs that have not been already scheduled in the S-TXOP. Each lite-BSRP Trigger frame may include a few STAs that can transmit ULL TC data during the DL slot by delaying the scheduled DL data that have lower priority than the ULL TC data.

In another embodiment, STAs may also signal the availability of UL ULL TC data within a DL slot, by setting a bit in an ACK sent in response to a DL PPDU or by using the short sequence described herein within a time gap or remaining time available in the DL slot. The AP can use this information to trigger the STA to receive UL ULL TC data in the next UL slot.

Figure 5E:
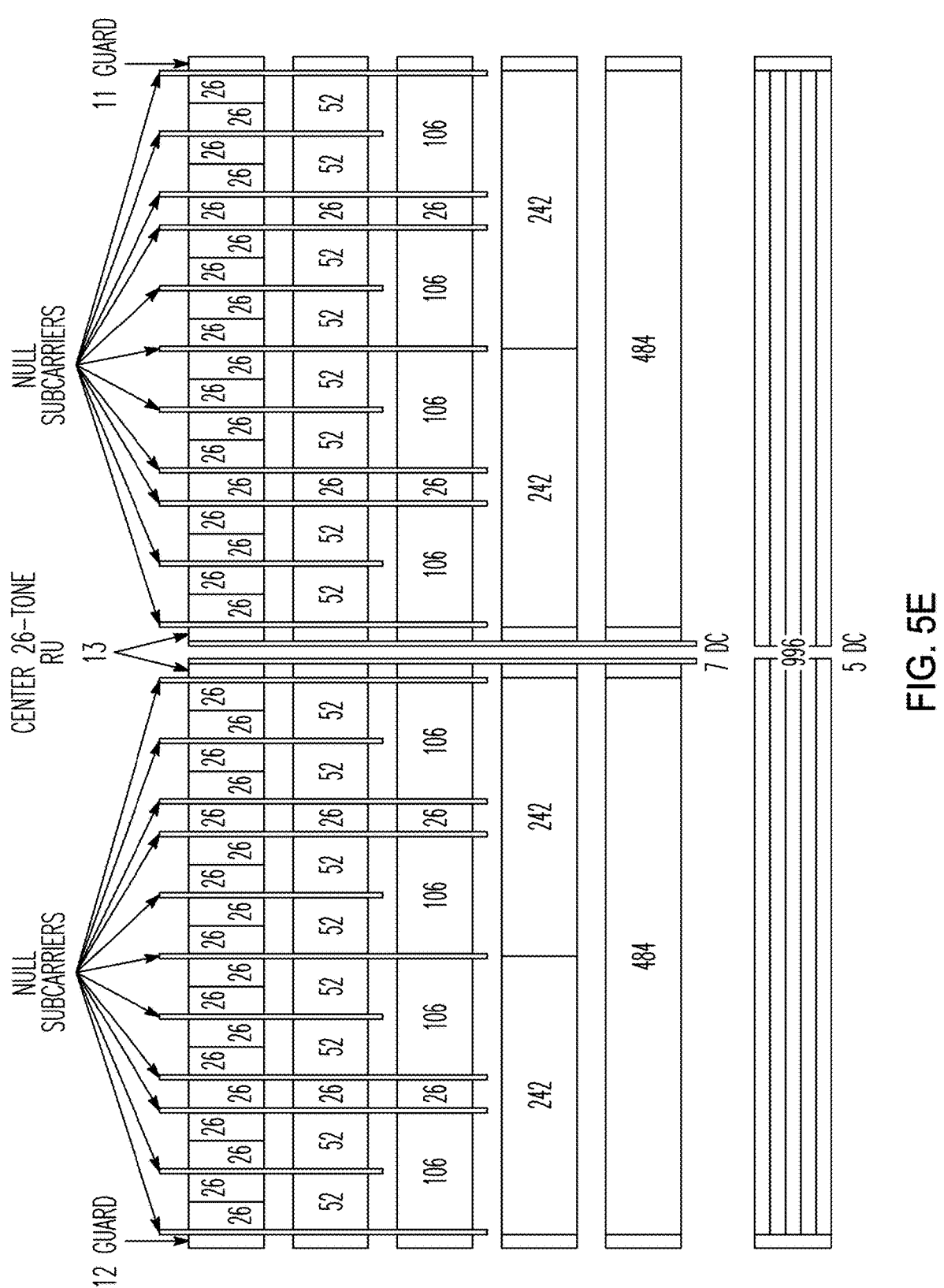
FIG. 5E illustrates resource unit (RU) locations in an example 80 MHz PPDU, in accordance with some embodi-ments.
Figure 5F:
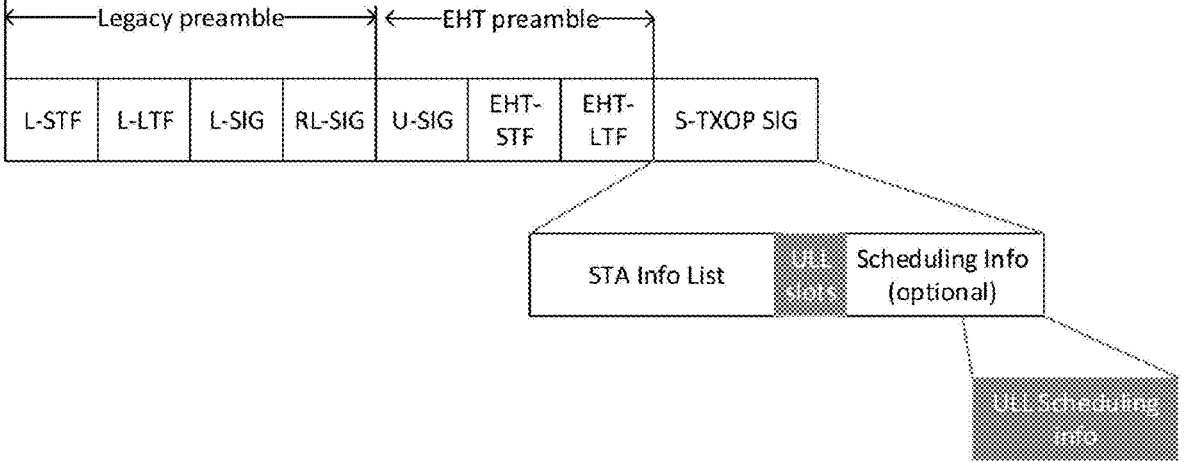
FIG. 5F illustrates enhanced S-TXOP scheduling infor-mation for ULL mode, in accordance with some embodi-ments.

FIG. 5E illustrates resource unit (RU) locations in an 80 MHz PPDU, in accordance with some embodiments. Any one or more of the RUs illustrated may be allocated to one or more STAs for use during a S-TXOP for an 80 MHZ PPDU. Other bandwidth PPDUs are also suitable for use.

Some embodiments are directed to an access point station (AP) configured for communicating with a plurality of non-AP stations (STAs) within a synchronized transmission opportunity (S-TXOP). The S-TXOP may comprise an S-TXOP trigger followed by a plurality of S-TXOP slots. In these embodiments, the S-TXOP slots may be configured for communication of synchronous data. In these embodiments, for communication of small time-critical (TC) packets within the S-TXOP with one or more of the STAs, the AP may configure the S-TXOP for asynchronous ultra-low latency (ULL) transmissions by providing a low-latency channel access opportunity within the S-TXOP.

In some embodiments, the small TC packets to be communicated asynchronously with the S-TXOP may comprise packets of a quality-of-service (QoS) stream (or traffic flow) having a low or ultra-low latency requirement and a size limit (e.g., a one-hundred bytes or less) which may be known apriori. In these embodiments, the small TC packets to be communicated asynchronously with the S-TXOP may be generated non-synchronously (i.e., not periodically or non-periodically, without following a well-known pattern). In these embodiments, the channel access opportunity provided within the S-TXOP for the small TC packets may be configured to meet the low latency requirement.

In some embodiments, the low latency requirement may be less than 1000 microseconds. In some embodiments, the low latency requirement may be an ultra-low latency requirement (e.g., of less than 100 microseconds and in some cases, in 10s of microseconds or less). In these embodiments, small TC packets to be communicated asynchronously are to be transmitted within a time frame indicated by their latency requirement. In these embodiments, a channel access opportunity is provided within the S-TXOP to meet the latency requirement.

In some embodiments, the synchronous data for communication in the S-TXOP slots may be generated synchronously (i.e., is generated periodically, may have a periodicity, and/or may follow a well-known pattern). In these embodiments, the synchronous data that is communicated within any one or more of the S-TXOP slots 406 may be communicated within a multi-user physical layer protocol data unit (MU-PPDU) (see FIG. 5E), although the scope of the embodiments is not limited in this respect.

In some embodiments, to configure the S-TXOP 402 for the asynchronous ULL transmissions, the AP may encode the S-TXOP trigger 404 to including information to indicate (i.e., to signal) that the S-TXOP is to include one or more ULL slots 506 for the asynchronous ULL transmissions. In these embodiments, the ULL slots 506 may have configurable (e.g., flexible) sizes and are configurable to occur within the S-TXOP 402 a SIFS after the S-TXOP trigger 404 and/an SIFS after one or more of the S-TXOP slots 406. An example of this is illustrated in FIG. 5B. In these embodiments illustrated in FIG. 5B, the ULL slots 506 (e.g., channel resources) are reserved for ULL transmissions regardless of whether or not a STA may use them. Accordingly, for an uplink transmission, a STA doesn't have to indicate a need for slot at the time of the S-TXOP trigger but simply go ahead and transmit a small TC packet during one or the ULL slots 506, although the scope of the embodiments is not limited in this respect.

In some embodiments, the AP may encode the S-TXOP trigger 404 to announce that the S-TXOP 402 includes one or more ULL slots 506 for the asynchronous ULL transmissions and to include within the S-TXOP trigger 404 resource unit (RU) size, MCS and duration requirements (including any such restrictions) for the asynchronous ULL transmissions.

In these embodiments, the ULL slots 506 may be advertised at the beginning of the S-TXOP and their periodicity may be adjusted based on latency requirements and efficiency tradeoffs. Resource allocation and configuration for using asynchronous transmissions within the ULL slots 506 may also be done a priori to enable minimal overhead, although the scope of the embodiments is not limited in this respect.

In some embodiments, to configure the S-TXOP for the asynchronous ULL transmissions, the AP may encode the S-TXOP trigger 404 to indicate that one or more pre-configured ULL resource units (RUs) 508 within the S-TXOP slots 406 are reserved for the asynchronous ULL transmissions. An example of this is illustrated in FIG. 5C which shows ULL RUs 508 that are reserved for asynchronous ULL transmissions within the S-TXOP slots 406. In these embodiments, the ULL RUs 508 are reserved for ULL transmissions regardless of whether or not a STA may use them.

In some embodiments, the one or more ULL RUs 508 within the S-TXOP slots 406 that are reserved for the asynchronous ULL transmissions may comprise one or more non-null tone RUs of a MU-PPDU that is transmitted within an S-TXOP slot 406, although the scope of the embodiments is not limited in this respect. Examples of non-null tone RUs that may be allocated during an S-TXOP slot are illustrated in FIG. 5E for an 80 MHz PPDU.

In some embodiments, the one or more RUs 508 within the S-TXOP slots 406 that are reserved for the asynchronous ULL transmissions comprise null tones of the MU-PPDU, although the scope of the embodiments is not limited in this respect. Examples of the null-tones that may be allocated during an S-TXOP slot 406 for asynchronous ULL transmissions are illustrated in FIG. 5E for an 80 MHz PPDU. The use of null-tones has little or no effect on existing transmissions of the MU-PPDUs and does not cause any spectral efficiency loss. In these embodiments, the one or more RUs 508 that are allocated for the asynchronous ULL transmissions may comprise only the null tones. In these embodiments, the tones (subcarriers) of non-null tone RUs used for synchronous transmissions are not used.

In some embodiments, the AP may decode signalling received within the S-TXOP 402 from one or more of the STAs indicating that the STA has uplink data ready send within the S-TXOP. The uplink data may comprise a small TC packet for an asynchronous ULL transmission. In these embodiments, the signalling may be received from the STA within an SIFS that immediately precedes an S-TXOP slot 406 that includes the small TC packet. In these embodiments, the small TC packet may be received from the STA on the one or more pre-configured ULL resource units (RUs) 508 within the S-TXOP slots 406 are reserved for the asynchronous ULL transmissions. In some of these embodiments illustrated in FIG. 5C, ULL transmission opportunities may reside in pre-configured RUs 508 of UL/DL S-TXOP slots 406, although the scope of the embodiments is not limited in this respect.

In some embodiments, in response to the signalling is received from the STA within an SIFS indicating that the STA has uplink data ready send, the AP may encode a lite-trigger frame (TF) 512 for transmission in the S-TXOP slot 416 that follows the SIFS. The lite TF may include uplink scheduling information for the S-TXOP slot 416 that includes an indication of a ULL RU 518 for use by the STA for transmission of the uplink data, although the scope of the embodiments is not limited in this respect. An example of this is illustrated in FIG. 5D. In these embodiments, the AP may reconfigure to S-TXOP slot 416 to include an additional allocation for an asynchronous ULL transmission of a small TC packet and adjust the resources accordingly.

In some embodiments, each of the S-TXOP slots 406 of the S-TXOP 402 may comprise either an uplink (UL) S-TXOP slot or a downlink (DL) S-TXOP slot. In these embodiments, for communication of the synchronous data, the AP may receive an UL MU-PPDU from one or more of the STAs within an UL S-TXOP slot and may transmit a DL MU PPDU to one or more of the STAs withing a DL S-TXOP, although the scope of the embodiments is not limited in this respect. In these embodiments, the AP may encode the S-TXOP trigger 404 to indicate an allocation of resource units within the S-TXOP slots for use by the STAs for the synchronous data for communication in the S-TXOP slots.

In some embodiments, the AP may be configured for operating in a wireless time-sensitive network (TSN). In some embodiments, the AP may comprise processing circuitry and the processing circuit may comprise a baseband processor, although the scope of the embodiments is not limited in this respect. In these embodiments, AP may include memory configured to store the S-TXOP trigger, although the scope of the embodiments is not limited in this respect.

Some embodiments are directed to a non-transitory computer-readable storage medium that stores instructions for execution by processing circuitry for an access point station (AP). In these embodiments, the processing circuitry may configure the AP for communicating with a plurality of non-AP stations (STAs) within a synchronized transmission opportunity (S-TXOP). The S-TXOP may comprise an S-TXOP trigger followed by a plurality of S-TXOP slots. The S-TXOP slots may be configured for communication of synchronous data. In these embodiments, for communication of small time-critical (TC) packets within the S-TXOP with one or more of the STAs, the processing circuitry may configure the S-TXOP for asynchronous ultra-low latency (ULL) transmissions by providing a low-latency channel access opportunity within the S-TXOP.

Some embodiments are directed to a method performed by processing circuitry of an access point station (AP) for communicating with a plurality of non-AP stations (STAs) within a synchronized transmission opportunity (S-TXOP). In these embodiments, the method may comprise encoding an S-TXOP trigger for transmission followed by a plurality of S-TXOP slots. For communication of small time-critical (TC) packets within the S-TXOP with one or more of the STAs. The method may further comprise configuring the S-TXOP for asynchronous ultra-low latency (ULL) transmissions by providing a low-latency channel access opportunity within the S-TXOP.

FIG. 6 illustrates a functional block diagram of a wireless communication device, in accordance with some embodiments. In one embodiment, FIG. 6 illustrates a functional block diagram of a communication device (STA) that may be suitable for use as an AP STA, a non-AP STA or other user device in accordance with some embodiments. The communication device 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber device, an access point, an access terminal, or other personal communication system (PCS) device.

The communication device 600 may include communications circuitry 602 and a transceiver 610 for transmitting and receiving signals to and from other communication devices using one or more antennas 601. The communications circuitry 602 may include circuitry that can operate the physical layer (PHY) communications and/or medium access control (MAC) communications for controlling access to the wireless medium, and/or any other communications layers for transmitting and receiving signals. The communication device 600 may also include processing circuitry 606 and memory 608 arranged to perform the operations described herein. In some embodiments, the communications circuitry 602 and the processing circuitry 606 may be configured to perform operations detailed in the above figures, diagrams, and flows.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication device 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication device 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication device 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting device.

In some embodiments, the communication device 600 may include one or more of a keyboard, a display, a non-volatile memory port, multiple antennas, a graphics processor, an application processor, speakers, and other mobile device elements. The display may be an LCD screen including a touch screen.

Although the communication device 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication device 600 may refer to one or more processes operating on one or more processing elements.

In some embodiments, a physical layer protocol data unit may be a physical layer conformance procedure (PLCP) protocol data unit (PPDU). In some embodiments, the AP and STAs may communicate in accordance with one of the IEEE 802.11 standards. IEEE 802.11-2016 is incorporated herein by reference. IEEE P802.11-REVmd/D2.4, August 2019, and IEEE draft specification IEEE P802.11ax/D5.0, October 2019 are incorporated herein by reference in their entireties. In some embodiments, the AP and STAs may be directional multi-gigabit (DMG) STAs or enhanced DMG (EDMG) STAs configured to communicate in accordance with IEEE 802.11ad standard or IEEE draft specification IEEE P802.11ay, February 2019, which is incorporated herein by reference.

The following patent applications are incorporated by reference: PCT/US2017/067134, Filed Dec. 18, 2017, Published Jun. 27, 2019 as WO2019/125396, and entitled "ENHANCED TIME SENSITIVE NETWORKING FOR WIRELESS COMMUNICATIONS"; PCT/US2018/035868, Filed Jun. 4, 2018, Published Dec. 12, 2019 as WO2019/236052, entitled "METHODS AND APPARATUS TO FACILITATE A SYNCHRONOUS TRANSMISSION OPPORTUNITY IN A WIRELESS LOCAL AREA NETWORK"; and U.S. Ser. No. 16/870,156, Filed May 8, 2020, Published as US2020-0267636 A1, entitled "EXTREME HIGH THROUGHPUT (EHT) TIME-SENSITIVE NETWORKING".

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of an access point station (AP), the apparatus comprising: processing circuitry; and memory, the processing circuitry to configure the AP for communicating with a plurality of non-AP stations (STAs) within a synchronized transmission opportunity (S-TXOP), the S-TXOP comprising an S-TXOP trigger followed by a plurality of S-TXOP slots, the S-TXOP slots being separate time slots within the S-TXOP and configured for communication of synchronous data, wherein for communication of small time-critical (TC) packets within the S-TXOP with one or more of the STAs, the processing circuitry is to configure the S-TXOP for asynchronous ultra-low latency (ULL) transmissions by providing a channel access opportunity within the S-TXOP, wherein for the asynchronous ULL transmissions, the S-TXOP trigger indicates that the S-TXOP is to include one or more ULL slots, the ULL slots to occur within the S-TXOP a short-interframe spacing (SIFS) after the S-TXOP trigger and/or an SIFS after one or more of the S-TXOP slots.

2. The apparatus of claim 1, wherein the small TC packets to be communicated asynchronously within the S-TXOP comprise packets of a quality-of-service (QoS) stream having a low latency requirement and a size limit, wherein the small TC packets to be communicated asynchronously within the S-TXOP are generated non-synchronously, and wherein the channel access opportunity provided within the S-TXOP for the small TC packets is configured to meet the low latency requirement.

3. The apparatus of claim 2, wherein the synchronous data for communication in the S-TXOP slots is generated synchronously, and wherein the synchronous data that is communicated within any one or more of the S-TXOP slots is communicated within a multi-user physical layer protocol data unit (MU-PPDU).

4. The apparatus of claim 2, wherein to configure the S-TXOP for the asynchronous ULL transmissions, the processing circuitry is configured to encode the S-TXOP trigger to indicate that one or more ULL resource units (RUs) within the S-TXOP slots are reserved for the asynchronous ULL transmissions.

5. The apparatus of claim 4, wherein the one or more ULL RUs within the S-TXOP slots that are reserved for the asynchronous ULL transmissions comprise one or more RUs of a MU-PPDU that is transmitted within an S-TXOP slot.

6. The apparatus of claim 4, wherein the one or more RUs within the S-TXOP slots that are reserved for the asynchronous ULL transmissions comprise null tones of a multi-user physical layer protocol data unit (MU-PPDU).

7. The apparatus of claim 4, wherein the processing circuitry is configured to decode signalling received within the S-TXOP from one of the STAs indicating that the STA has uplink data ready send within the S-TXOP, the uplink data comprising a small TC packet for an asynchronous ULL transmission, wherein the signalling is received from the STA within an SIFS that precedes an S-TXOP slot that includes the small TC packet, and wherein the small TC packet is received from the STA on the one or more ULL resource units (RUs) within the S-TXOP slots are reserved for the asynchronous ULL transmissions.

8. The apparatus of claim 7, wherein in response to the signalling is received from the STA within an SIFS indicating that the STA has uplink data ready send, the processing circuitry is configured to:

encode a lite trigger frame (TF) for transmission in the S-TXOP slot that follows the SIFS, the lite TF including uplink scheduling information for the S-TXOP slot that includes an indication of a ULL RU 518 for use by the STA for transmission of the uplink data.

9. The apparatus of claim 3, wherein each of the S-TXOP slots of the S-TXOP comprise either an uplink (UL) S-TXOP slot or a downlink (DL) S-TXOP slot, wherein for communication of the synchronous data, the processing circuitry is configured to receive an UL MU-PPDU from one or more of the STAs within an UL S-TXOP slot and transmit a DL MU PPDU to one or more of the STAs within a DL S-TXOP, and wherein the processing circuitry is configured to encode the S-TXOP trigger to indicate an allocation of resource units within the S-TXOP slots for use by the STAs for the synchronous data for communication in the S-TXOP slots.

10. The apparatus of claim 1, wherein the AP is configured for operating in a wireless time-sensitive network (TSN), wherein the processing circuitry comprises a baseband processor, and wherein the memory is configured to store the S-TXOP trigger.

11. An apparatus of an access point station (AP), the apparatus comprising: processing circuitry; and memory, the processing circuitry to configure the AP for communicating with a plurality of non-AP stations (STAs) within a synchronized transmission opportunity (S-TXOP), the S-TXOP comprising an S-TXOP trigger followed by a plurality of S-TXOP slots, the S-TXOP slots configured for communication of synchronous data, wherein for communication of small time-critical (TC) packets within the S-TXOP with one or more of the STAs, the processing circuitry is to configure the S-TXOP for asynchronous ultra-low latency (ULL) transmissions by providing a channel access opportunity within the S-TXOP, wherein the small TC packets to be communicated asynchronously within the S-TXOP comprise packets of a quality-of-service (QoS) stream having a low latency requirement and a size limit, wherein the small TC packets to be communicated asynchronously within the S-TXOP are generated nonsynchronously, and wherein the channel access opportunity provided within the S-TXOP for the small TC packets is configured to meet the low latency requirement, and wherein to configure the S-TXOP for the asynchronous ULL transmissions, the processing circuitry is configured to:

encode the S-TXOP trigger to including information to indicate that the S-TXOP is to include one or more ULL slots for the asynchronous ULL transmissions, the ULL slots having configurable sizes and are configurable to occur within the S-TXOP a short-interframe spacing (SIFS) after the S-TXOP trigger and an SIFS after one or more of the S-TXOP slots.

12. The apparatus of claim 11, wherein the processing circuitry is to encode the S-TXOP trigger to announce that the S-TXOP includes the one or more ULL slots for the asynchronous ULL transmissions and to include within the S-TXOP trigger, a resource unit (RU) size, and MCS and duration requirements for the asynchronous ULL transmissions.

13. A non-transitory computer-readable storage medium that stores instructions for execution by processing circuitry for an access point station (AP), the processing circuitry to configure the AP for communicating with a plurality of non-AP stations (STAs) within a synchronized transmission opportunity (S-TXOP), the S-TXOP comprising an S-TXOP trigger followed by a plurality of S-TXOP slots, the S-TXOP slots being separate time slots within the S-TXOP and configured for communication of synchronous data, wherein for communication of small time-critical (TC) packets within the S-TXOP with one or more of the STAs, the processing circuitry is to configure the S-TXOP for asynchronous ultra-low latency (ULL) transmissions by providing a channel access opportunity within the S-TXOP, wherein for the asynchronous ULL transmissions, the S-TXOP trigger indicates that the S-TXOP is to include one or more ULL slots, the ULL slots to occur within the S-TXOP a short-interframe spacing (SIFS) after the S-TXOP trigger and/or an SIFS after one or more of the S-TXOP slots.

14. The non-transitory computer-readable storage medium of claim 13, wherein the small TC packets to be communicated asynchronously within the S-TXOP comprise packets of a quality-of-service (QoS) stream having a low latency requirement and a size limit, wherein the small TC packets to be communicated asynchronously within the S-TXOP are generated nonsynchronously, and wherein the channel access opportunity provided within the S-TXOP for the small TC packets is configured to meet the low latency requirement.

15. The non-transitory computer-readable storage medium of claim 14, wherein the synchronous data for communication in the S-TXOP slots is generated synchronously, and wherein the synchronous data that is communicated within any one or more of the S-TXOP slots is communicated within a multi-user physical layer protocol data unit (MU-PPDU).

16. The non-transitory computer-readable storage medium of claim 14, wherein to configure the S-TXOP for the asynchronous ULL transmissions, the processing circuitry is configured to:

encode the S-TXOP trigger to including information to indicate that the S-TXOP is to include the one or more ULL slots for the asynchronous ULL transmissions, the ULL slots having configurable sizes.

17. The non-transitory computer-readable storage medium of claim 16, wherein the processing circuitry is to encode the S-TXOP trigger to announce that the S-TXOP includes the one or more ULL slots for the asynchronous ULL transmissions and to include within the S-TXOP trigger, a resource unit (RU) size, and MCS and duration requirements for the asynchronous ULL transmissions.

18. The non-transitory computer-readable storage medium of claim 14, wherein to configure the S-TXOP for the asynchronous ULL transmissions, the processing circuitry is configured to encode the S-TXOP trigger to indicate that one or more ULL resource units (RUs) within the S-TXOP slots are reserved for the asynchronous ULL transmissions.

* * * * *